US012693499B2

(12) United States Patent　　　(10) Patent No.:　US 12,693,499 B2
Uno　　　　　　　　　　　　　　　　(45) Date of Patent:　Jul. 28, 2026

(54) IMAGING LENS SYSTEM, CAMERA MODULE, IN-VEHICLE SYSTEM, VEHICLE

(71) Applicant: Maxell, Ltd., Kyoto (JP)

(72) Inventor: Katsuya Uno, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 224 days.

(21) Appl. No.: 18/570,660

(22) PCT Filed: Apr. 28, 2022

(86) PCT No.: PCT/JP2022/019221
§ 371 (c)(1),
(2) Date: Dec. 15, 2023

(87) PCT Pub. No.: WO2022/264700
PCT Pub. Date: Dec. 22, 2022

(65) Prior Publication Data
US 2024/0288665 A1　　Aug. 29, 2024

(30) Foreign Application Priority Data

Jun. 18, 2021　(JP) ................................. 2021-101527

(51) Int. Cl.
*G02B 13/00*　　(2006.01)
*G02B 9/04*　　(2006.01)
(52) U.S. Cl.
CPC ........... *G02B 13/0015* (2013.01); *G02B 9/04* (2013.01)
(58) Field of Classification Search
CPC ............................... G02B 13/0015; G02B 9/04
USPC ....................................................... 359/793
See application file for complete search history.

(56) References Cited

U.S. PATENT DOCUMENTS

| | | |
|---|---|---|
| 2003/0043474 A1 | 3/2003 | Minefuji |
| 2017/0213094 A1 | 7/2017 | Kamiya |
| 2019/0121095 A1 | 4/2019 | Tada et al. |

(Continued)

FOREIGN PATENT DOCUMENTS

| | | |
|---|---|---|
| JP | 2002-277740 A | 9/2002 |
| JP | 2008-134494 A | 6/2008 |
| JP | 2016-035633 A | 3/2016 |

(Continued)

OTHER PUBLICATIONS

International Search Report and Written Opinion mailed on Jul. 5, 2022, received for PCT Application PCT/JP2022/019221, filed on Apr. 28, 2022, 12 pages including English Translation.

(Continued)

*Primary Examiner* — William Choi
(74) *Attorney, Agent, or Firm* — XSENSUS LLP

(57)　　　　ABSTRACT

An imaging lens system includes, sequentially from an object side toward an image side: a front lens group Gf including: a first lens, which is a meniscus lens having negative power with an object-side surface whose convex surface faces the object side; a second lens, which is a meniscus lens with the object-side surface whose concave surface faces the object side; and a third lens having positive power; an iris; and a rear lens group Gr including: a fourth lens having positive power; a fifth lens, a sixth lens constituting a cemented lens; and a seventh lens. The imaging lens system satisfies a following Expression (1):

$$2.0 < Frg/F < 3.0 \qquad (1)$$

where Frg is a composite focal length of the rear lens group Gr and F is a focal length of an entire optical system.

7 Claims, 26 Drawing Sheets

(56)          References Cited

U.S. PATENT DOCUMENTS

2021/0231917 A1     7/2021  Suzuki

FOREIGN PATENT DOCUMENTS

JP        2019-078839  A      5/2019
JP        2020-009386  A      1/2020
JP        2021-117447  A      8/2021

OTHER PUBLICATIONS

Office Action issued on Apr. 1, 2025 in the counterpart JP Patent
Application No. 2021-101527, 7pp.

1

IMAGING LENS SYSTEM, CAMERA MODULE, IN-VEHICLE SYSTEM, VEHICLE

CROSS-REFERENCE TO RELATED APPLICATIONS

This application is based on PCT filing PCT/JP2022/019221, filed Apr. 28, 2022, which claims priority from Japanese Patent Application No. 2021-101527, filed Jun. 18, 2021, the disclosure of each is incorporated herein in its entirety by reference.

TECHNICAL FIELD

The present disclosure relates to an imaging lens system, a camera module, an in-vehicle system, and a vehicle.

BACKGROUND ART

In related art, for the purpose of ensuring the visibility of a driver as an imaging lens system of a car-mounted camera, a stereographic projection lens system that captures a larger area in the peripheral area than in the central area has been required.

In recent years, car-mounted cameras have been increasingly demanded to have sensing capabilities for purposes such as achieving autonomous driving. The stereographic projection imaging lens system of related art captures the peripheral area larger than the central area, and thus the ratio of the change in the image height to the change in the angle of view differs depending on the angle of view. Therefore, the images captured by a stereographic projection imaging lens make the speed of the captured automobile traveling at a constant speed appear different between the peripheral area and the central area, which complicates the calculation for sensing and may lead to false recognition. Therefore, in order to achieve stable and accurate sensing capabilities, an equidistant projection imaging lens system that maintains a uniform ratio of the change in the image height to the change in the angle of view from the central area to the peripheral area is required. For example, Patent Literature 1 describes an equidistant projection imaging lens system mounted on a surveillance camera or the like.

CITATION LIST

Patent Literature

Patent Literature 1: Japanese Unexamined Patent Application Publication No. 2008-134494

SUMMARY OF INVENTION

Technical Problem

However, the imaging lens system described in Patent Literature 1 has a problem that a diameter of a front lens arranged closest to the object side is large compared to a size of an optical image, and a total track length of the lens system is also long, resulting in low brightness. If the front lens is large, there is a high possibility that it will be hit by flying stones or the like when the imaging lens system is mounted on the outside of a car, and it is difficult to achieve compactness required for lens systems mounted on car-mounted cameras. Also, the long total track length of the lens system is a factor that prevents a lens system to achieve compactness. Furthermore, the F-number of the imaging lens system described in Patent Literature 1 is around 2.4 to 3.0, which is not bright enough, resulting in longer detection times for sensors and an inability to meet the requirements for instantaneous sensing capabilities required for autonomous driving.

The present disclosure has been made in view of such problems, and an object of the present disclosure is to provide an imaging lens system, a camera module, an in-vehicle system, and a vehicle which can be made compact and have sufficient brightness.

Solution to Problem

An imaging lens system according to an example aspect includes, sequentially from an object side toward an image side:

a front lens group comprising:
  a first lens, the first lens being a meniscus lens having negative power with an object-side surface whose convex surface faces the object side;
  a second lens, the second lens being a meniscus lens with the object-side surface whose concave surface faces the object side; and
  a third lens having positive power;
an iris; and
a rear lens group comprising:
  a fourth lens having positive power;
  a fifth lens and a sixth lens constituting a cemented lens; and
  a seventh lens, wherein
the imaging lens system satisfies a following Expression (1):

$$2.0 < Frg/F < 3.0 \qquad (1)$$

where Frg is a composite focal length of the rear lens group and F is a focal length of an entire optical system.

Advantageous Effects of Invention

According to the present disclosure, it is possible to provide an imaging lens system, a camera module, an in-vehicle system, and a vehicle which can be made compact and have sufficient brightness.

DESCRIPTION OF EMBODIMENTS

Figure 1:
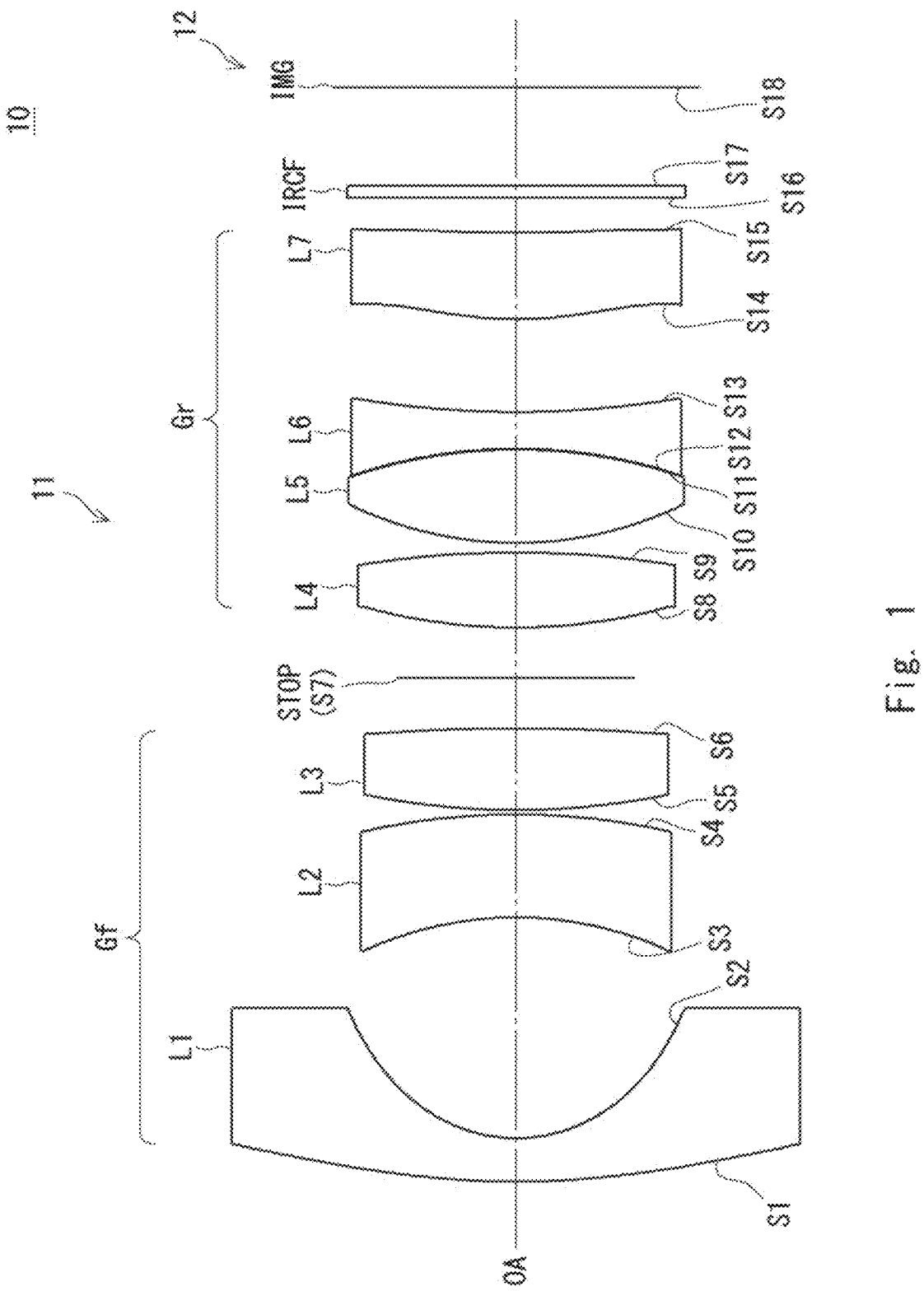
FIG. 1 is a cross-sectional view showing a configuration of a camera module and an imaging lens system according to an Example 1.

An embodiment of the present disclosure will be described below with reference to the drawings. In this embodiment, a highly reliable system can be implemented, especially in a sensing system, and contributes to the development of a resilient infrastructure. The target of this embodiment is "9. Build resilient infrastructure, promote inclusive and sustainable industrialization and foster innovation" of the United Nations Sustainable Development Goals (SDGs), "9.1 Develop quality, reliable, sustainable and resilient infrastructure, including regional and transborder infrastructure, to support economic development and human well-being, with a focus on affordable and equitable access for all".

First Embodiment: Imaging Lens System

An imaging lens system according to a first embodiment includes, sequentially from an object side toward an image side, a front lens group including a first lens, which is a meniscus lens having negative power with an object-side surface whose convex surface faces an object side, a second lens, which is a meniscus lens with the object-side surface whose concave surface faces the object side, and a third lens having positive power, an iris, and a rear lens group including a fourth lens having positive power, a fifth lens and a sixth lens constituting a cemented lens, and a seventh lens.

The imaging lens system according to the first embodiment satisfies the following Expression (1):

$$2.0 < Frg/F < 3.0 \tag{1}$$

where Frg is the composite focal length of the rear lens group and F is the focal length of the entire optical system.

Thus, it is possible to provide an imaging lens system and a camera module which can be made compact and have sufficient brightness.

Specifically, in the imaging lens system according to the first embodiment, roughly, the front lens group is responsible for the angle of view properties of the imaging lens system, and the rear lens group is responsible for the imaging performance. The imaging lens system according to the first embodiment is an equidistant projection lens system, and when $\Theta$ is the angle of incidence of chief ray into the front lens group and $\theta$ is the angle of incidence of chief ray into the rear lens group (angle formed by the center optical axis of chief ray), the relational expression $\theta = \arctan (F/Frg \cdot \theta)$ holds. According to this relational expression, when the composite focal length Frg of the rear lens group becomes short, the angle of incidence $\theta$ of the chief ray into the rear lens group becomes large, the height of the image on a capturing element (hereinafter also called "image height") becomes sufficient, and thus the total track length of the optical system of the imaging lens system can be shortened to achieve compactness. However, if the lower limit of the above Expression (1) is exceeded, the composite focal length Frg of the rear lens group becomes too short relative to the focal length F of the entire optical system of the imaging lens system, in other words, the power of the rear lens group becomes too strong, and thus an aberration generated in the rear lens group becomes large. On the other hand, if the upper limit of the above Expression (1) is exceeded, from the above relational expression, the incident angle $\theta$ of the chief ray to the rear lens group becomes small, image height cannot be obtained sufficiently, and the total track length of the optical system of the imaging lens system becomes long, and compactness cannot be achieved.

Therefore, by satisfying the above Expression (1), compactness of the imaging lens system can be achieved and the aberration can be sufficiently reduced. Further, since the aberration can be sufficiently reduced, the imaging lens system can be sufficiently brightened.

Further, the following Expression (2) is preferably satisfied when the distance on the center optical axis between the object-side surface of the first lens and the iris is expressed by L1–STOP.

$$(L1 - STOP)/F < 3.5 \tag{2}$$

Thus, if the above Expression (2) is satisfied, the position of the iris can be arranged relatively close to the object side, and therefore, the position of the incident pupil is also formed relatively close to the object side. Therefore, the diameter of the first lens arranged closest to the object side among the lenses included in the front lens group can be reduced, and the chance of collision of a stepping stone with the first lens can be reduced, and also the imaging lens system can be made compact.

Further, the following Expression (3) is preferably satisfied.

$$-0.7 < F1/F3 < -0.4 \quad (3)$$

where F1 is the focal length of the first lens and F3 is the focal length of the third lens.

By satisfying the above Expression (3), the power of the first lens in the front lens group can be increased compared with the power of the third lens, the length of the optical system in the front lens group can be shortened, and thus the imaging lens system can be made compact. Specifically, if the lower limit of the above Expression (3) is exceeded, the power of the first lens becomes too small, and therefore imaging lens system cannot be made compact. Furthermore, the angle of incidence of ray into the rear lens group becomes large, which makes it difficult to correct the aberration in the rear lens group. On the other hand, if the upper limit of Expression (3) is exceeded, the power of the first lens becomes too large, so that the aberration generated by the first lens becomes too large, and thus the second to seventh lenses cannot correct the aberration.

The following Expression (4) is preferably satisfied.

$$-1.8 < F1/F < -1.5 \quad (4)$$

where F1 is the focal length of the first lens.

By satisfying the above Expression (4), the power of the first lens can be increased for the entire optical system of the imaging lens system, and the imaging lens system can be made compact. Specifically, if the lower limit of the above Expression (4) is exceeded, the power of the first lens becomes too small, making it impossible to achieve a favorable angle of view property and widening the angle of view. On the other hand, if the upper limit of the above Expression (4) is exceeded, the power of the first lens becomes too large, resulting in a significant aberration in the first lens, and it becomes difficult to fully correct the aberration in the second to seventh lenses.

In addition, it is preferable that the third lens is a biconvex lens, the fourth lens is a biconvex lens, the convex surface of the object-side surface of the fifth lens faces the object side, and the concave surface of the image-side surface of the sixth lens faces the image side. This configuration allows for the shape and arrangement of the second lens and the cemented lens composed of the fifth lens and the sixth lens and the shape and arrangement of the third lens and the fourth lens to be symmetrical across the iris. In other words, in the imaging lens system, by arranging the second to sixth lenses in a so-called tandem configuration, it becomes possible to perform effective correction of aberrations such as coma aberration, lateral color aberration, and distortion.

Second Embodiment: Camera Module

A camera module according to a second embodiment includes the imaging lens system described above and a capturing element arranged at a focal point of the imaging lens system. Thus, the camera module can be made compact, and sufficient brightness of the camera module can be obtained.

Next, examples of the imaging lens system according to the first embodiment and the camera module according to the second embodiment will be described with reference to the drawings.

Example 1

FIG. 1 is a cross-sectional view showing a configuration of a camera module 10 according to an Example 1. Specifically, the camera module 10 includes an imaging lens system 11 and a capturing element 12. The imaging lens system 11 and the capturing element 12 are housed in a lens barrel (not shown).

The capturing element 12 is an element for converting received light into an electric signal, and for example, a CCD image sensor or a CMOS image sensor is used. The capturing element 12 is arranged at an imaging position (focal position) of the imaging lens system 11.

The imaging lens system 11 according to the Example 1 is composed of a front lens group Gf composed of a first lens L1, a second lens L2, and a third lens L3, an aperture iris (STOP), a rear lens group Gr composed of a fourth lens L4, a fifth lens L5, a sixth lens L6, and a seventh lens L7, and an infrared cut filter (IRCF), which are arranged in this order from the object side toward the image side. A focal plane of the imaging lens system 11 is shown by the abbreviation IMG. The first lens L1 to the seventh lens L7 are glass lenses.

The first lens L1 is a glass lens having negative power. The object-side surface S1 of the first lens L1 has an aspheric shape with a convex surface facing the object side. The image-side surface S2 of the first lens L1 has an aspheric shape with a concave surface facing the image side.

The second lens L2 is a glass lens having negative power. The object-side surface S3 of the second lens L2 has a spherical shape with a concave surface facing the object side. The image-side surface S4 of the second lens L2 has a spherical shape with a convex surface facing the image side.

The third lens L3 is a glass lens having positive power. The object-side surface S5 of the third lens L3 has a spherical shape with a convex surface facing the object side. The image-side surface S6 of the third lens L3 has a spherical shape with a convex surface facing the image side.

The iris STOP is an iris that determines an F value (F Number, Fno) of a lens system. The iris STOP is arranged between the third lens L3 and the fourth lens L4.

The fourth lens L4 is a glass lens having positive power. The object-side surface S8 of the fourth lens L4 has a spherical shape with a convex surface facing the object side. The image-side surface S9 of the fourth lens L4 has a spherical shape with a convex surface facing the image side.

The fifth lens L5 is a glass lens having positive power. The object-side surface S10 of the fifth lens L5 has a spherical shape with a convex surface facing the object side. The image-side surface S11 of the fifth lens L5 has a spherical shape with a convex surface facing the image side.

The sixth lens L6 is a glass lens having negative power. The object-side surface S12 of the sixth lens L6 has a spherical shape with a concave surface facing the object side. The image-side surface S13 of the sixth lens L6 has a spherical shape with a concave surface facing the image side.

The fifth lens L5 and the sixth lens L6 constitute a cemented lens. That is, the image-side surface S11 of the fifth lens L5 and the object-side surface S12 of the sixth lens L6 are in contact with each other. The fifth lens L5 and the sixth lens L6 are bonded by an adhesive layer having a thickness of 0.005 mm on the axis.

The seventh lens L7 is a glass lens having positive power. The object-side surface S14 of the seventh lens L7 has an aspheric shape with a convex surface facing the object side. The image-side surface S15 of the seventh lens L7 has an aspheric shape with a concave surface facing the image side.

The infrared cut filter (IRCF) is a filter for cutting light in the infrared region. When the imaging lens system 11 is designed, the imaging lens system 11 and the infrared cut filter are handled as one integrated component. However, the infrared cut filter is not an essential component of the imaging lens system 11. The infrared cut filter is disposed on the image side of the seventh lens L7.

Table 1 shows lens data of each lens surface in the imaging lens system 11 according to the Example 1. Table 1 shows, as the lens data of each lens surface, a curvature radius (mm), a thickness (mm) between surfaces on the central optical axis, a refractive index Nd for a d-line, and an Abbe's number vd for the d-line. Surfaces marked with "*" are aspherical surfaces.

TABLE 1

| Surface Number | Curvature Radius (mm) | Thickness (mm) | Nd | vd |
|---|---|---|---|---|
| Lens Surface S1 * | 21.604 | 1.116 | 1.768 | 49.2 |
| Lens Surface S2 * | 3.978 | 5.607 | — | — |
| Lens Surface S3 | −9.465 | 2.618 | 1.589 | 61.3 |
| Lens Surface S4 | −18.057 | 0.114 | — | — |
| Lens Surface S5 | 19.362 | 2.081 | 2.001 | 29.1 |
| Lens Surface S6 | −49.999 | 1.288 | — | — |
| Iris Surface S7 | 0.000 | 1.275 | — | — |
| Lens Surface S8 | 14.434 | 1.916 | 1.550 | 75.5 |
| Lens Surface S9 | −25.723 | 0.237 | — | — |
| Lens Surface S10 | 9.833 | 2.392 | 1.729 | 54.7 |
| Lens Surface S11 | −13.237 | 0.005 | 1.517 | 43.0 |
| Lens Surface S12 | −13.237 | 0.942 | 1.946 | 18.0 |
| Lens Surface S13 | 24.835 | 2.361 | — | — |
| Lens Surface S14 * | 9.799 | 2.211 | 1.619 | 63.9 |

TABLE 1-continued

| Surface Number | Curvature Radius (mm) | Thickness (mm) | Nd | vd |
|---|---|---|---|---|
| Lens Surface S15 * | 37.647 | 0.890 | — | — |
| IRCF Surface S16 | 0.000 | 0.300 | 1.517 | 64.2 |
| IRCF Surface S17 | 0.000 | 2.695 | — | — |
| IMG Surface S18 | 0.000 | 0.000 | — | — |

The aspherical surface shape adopted for the lens surface is expressed by the below-shown expression, in which: z is a sag: c is the inverse of the radius of the curvature; k is a conic constant; h is a height of a ray from an optical axis OA; and $A_4, A_6, A_8, A_{10}, A_{12}, A_{14}$, and $A_{16}$ are 4th, 6th, 8th, 10th, 12th, 14th, and 16th order aspherical surface coefficients, respectively.

$$z = \frac{ch^2}{1 + \sqrt{1 - (1+k)c^2 h^2}} + A_4 h^4 + A_6 h^6 + A_8 h^8 + \qquad \text{[Expression 1]}$$
$$A_{10} h^{10} + A_{12} h^{12} + A_{14} h^{14} + A_{16} h^{16}$$

Table 2 shows aspherical surface coefficients for defining aspherical surface shapes of aspherical lens surfaces in the imaging lens system 11 according to the Example 1. Further, in Table 2, for example, "−2.13593 E−04" means "−2.13593×10$^{-4}$". The above-described numerical explanations apply to other tables shown later.

TABLE 2

| | k | $A_4$ | $A_6$ | $A_8$ |
|---|---|---|---|---|
| Lens Surface S1 | 3.477 | −2.13593E−04 | 3.14156E−06 | −7.15846E−08 |
| Lens Surface S2 | −0.359 | 2.33544E−04 | 8.69562E−06 | −9.35441E−07 |
| Lens Surface S14 | −0.569 | −1.49996E−03 | −8.50460E−06 | −1.65570E−06 |
| Lens Surface S15 | 0.000 | −4.29769E−04 | −3.69227E−05 | 2.72647E−06 |

| | $A_{10}$ | $A_{12}$ | $A_{14}$ | $A_{16}$ |
|---|---|---|---|---|
| Lens Surface S1 | 5.95037E−10 | −1.36677E−12 | 0.00000E+00 | 0.00000E+00 |
| Lens Surface S2 | 1.67854E−07 | −5.75423E−09 | 0.00000E+00 | 0.00000E+00 |
| Lens Surface S14 | 5.82495E−08 | 1.19555E−09 | 0.00000E+00 | 0.00000E+00 |
| Lens Surface S15 | −1.00022E−07 | 3.48016E−09 | 0.00000E+00 | 0.00000E+00 |

Figure 2A:
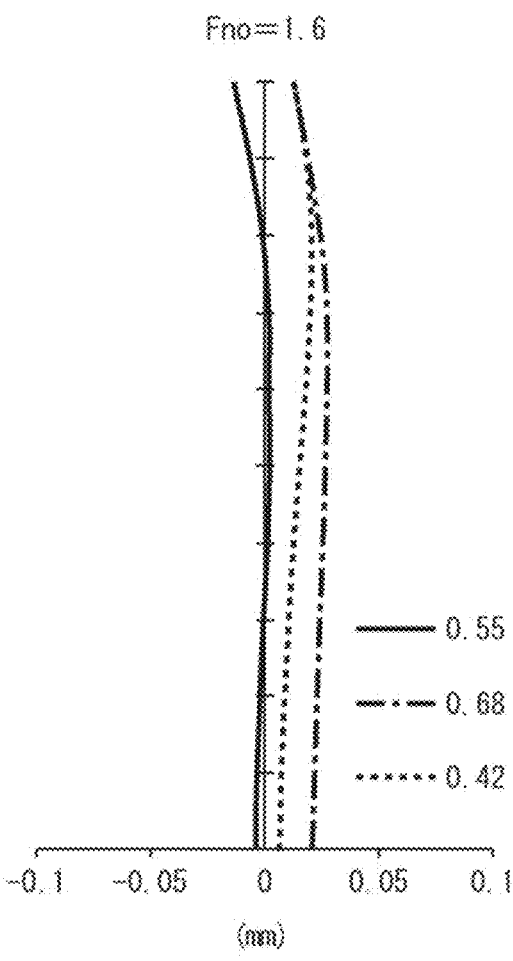
FIG. 2A is a spherical aberration diagram (longitudinal aberration diagram) of the imaging lens system according to the Example 1.
Figure 2B:
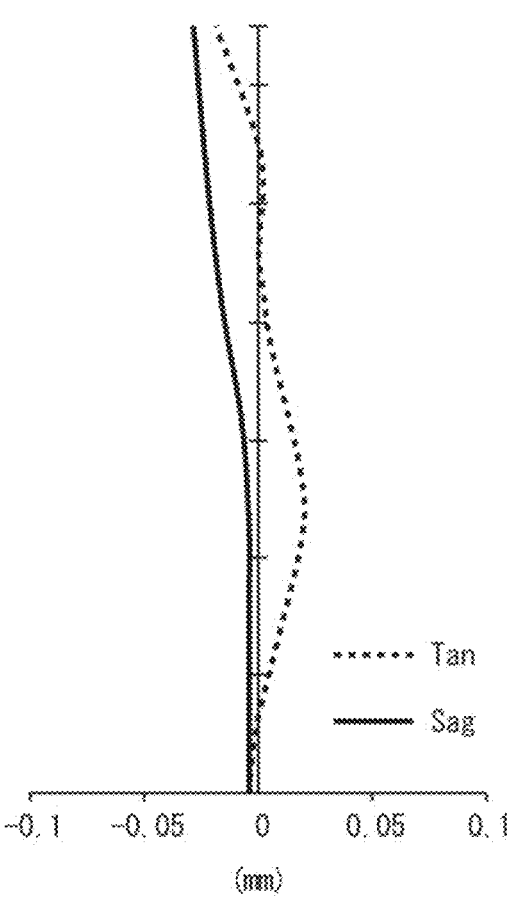
FIG. 2B is a field curvature diagram of the imaging lens system according to the Example 1.
Figure 2C:
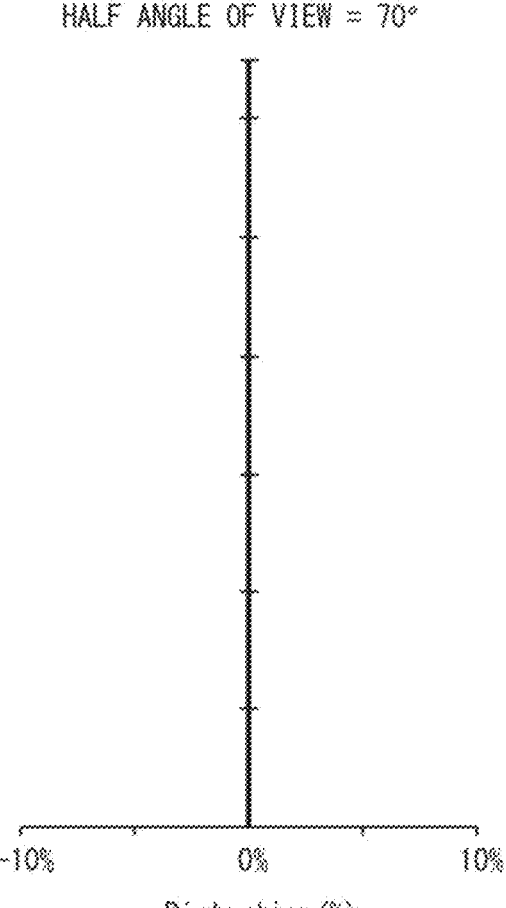
FIG. 2C is a distortion diagram of the imaging lens system according to the Example 1.

Next, an aberration will be described with reference to the drawings. FIGS. 2A to 2C show a spherical aberration (longitudinal aberration), field curvature, and distortion (equidistant projection reference) in the imaging lens system 11 according to the Example 1. As shown in FIGS. 2A to 2C, the imaging lens system 11 of Example 1, the F number is 1.6 and a half angle of view is 70°.

In the longitudinal aberration of FIG. 2A, the horizontal axis indicates positions at which the ray intersects the optical axis OA, and the vertical axis indicates passing heights of rays on the incident pupil. Further, FIG. 2A shows results of simulations of rays having wavelengths of 420 nm, 550 nm, and 680 nm, respectively.

In the field curvature diagram of FIG. 2B, the horizontal axis indicates distances in the direction of the optical axis OA, and the vertical axis indicates image heights (fields of view). In the field curvature diagram of FIG. 2B, Sag indicates the imaging position in the sagittal ray bundle, and Tan indicates the imaging position in the tangential ray bundle. FIG. 2B shows a result of a simulation of a ray having a wavelength of 550 nm.

In the distortion diagram of FIG. 2C, the horizontal axis indicates distortion amounts (%) of an image, and the vertical axis indicates image heights (fields of view). FIG. 2C shows a result of a simulation of a ray having a wavelength of 550 nm.

Example 2

Figure 3:
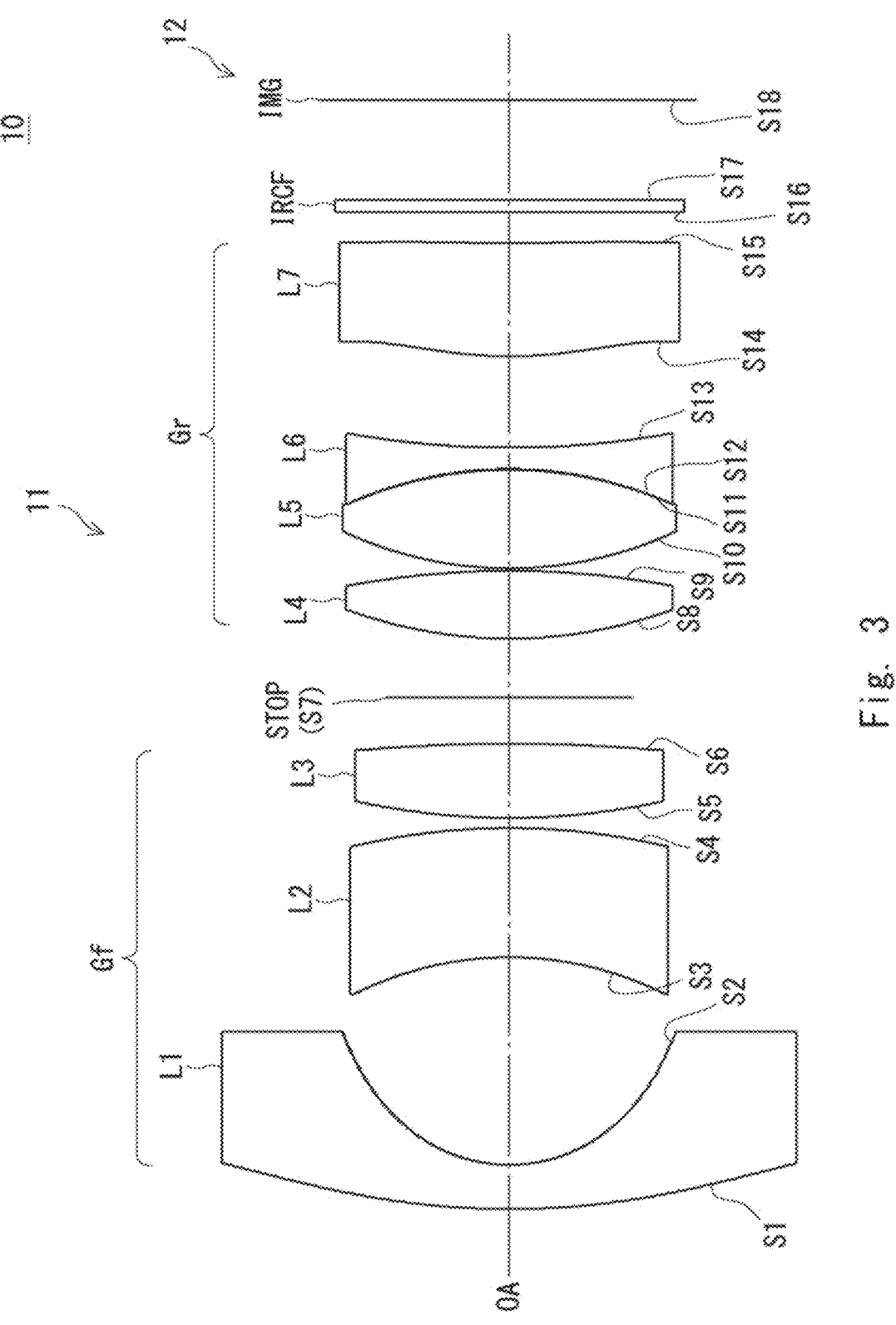
FIG. 3 is a cross-sectional view showing a configuration of a camera module and an imaging lens system according to an Example 2.

FIG. 3 is a cross-sectional view showing the camera module 10 according to an Example 2. Since the imaging lens system 11 according to the Example 2 has the same lens configuration as that of the Example 1, the descriptions thereof will be omitted. Hereinafter, property data of the imaging lens system 11 according to the Example 2 will be described.

Table 3 shows lens data of each lens surface in the imaging lens system 11 according to the Example 2. Since the items shown in Table 3 are the same as those in Table 1, descriptions thereof is omitted.

TABLE 3

| Surface Number | Curvature Radius (mm) | Thickness (mm) | Nd | vd |
|---|---|---|---|---|
| Lens Surface S1 * | 21.392 | 1.122 | 1.768 | 49.2 |
| Lens Surface S2 * | 3.993 | 5.262 | — | — |
| Lens Surface S3 | −8.710 | 3.273 | 1.550 | 75.5 |
| Lens Surface S4 | −17.131 | 0.250 | — | — |
| Lens Surface S5 | 17.734 | 1.895 | 1.911 | 35.3 |
| Lens Surface S6 | −41.865 | 1.150 | — | — |
| Iris Surface S7 | 0.000 | 1.503 | — | — |
| Lens Surface S8 | 11.912 | 1.712 | 1.569 | 56.0 |
| Lens Surface S9 | −22.557 | 0.069 | — | — |
| Lens Surface S10 | 9.925 | 2.505 | 1.593 | 68.6 |
| Lens Surface S11 | −10.028 | 0.005 | 1.517 | 43.0 |
| Lens Surface S12 | −10.028 | 0.540 | 1.870 | 20.0 |
| Lens Surface S13 | 23.038 | 2.318 | — | — |
| Lens Surface S14 * | 10.183 | 2.870 | 1.619 | 63.9 |
| Lens Surface S15 * | 57.541 | 0.798 | — | — |
| IRCF Surface S16 | 0.000 | 0.300 | 1.517 | 64.2 |
| IRCF Surface S17 | 0.000 | 2.450 | — | — |
| IMG Surface S18 | 0.000 | 0.000 | — | — |

Table 4 shows aspherical surface coefficients for defining aspherical surface shapes of aspherical lens surfaces in the imaging lens system 11 according to the Example 2. In Table 4, the aspherical surface shape adopted for the lens surface is expressed by an expression similar to that in the Example 1.

TABLE 4

| | k | $A_4$ | $A_6$ | $A_8$ |
|---|---|---|---|---|
| Lens Surface S1 | −1.026 | 1.93868E−04 | −1.20096E−05 | 2.82312E−07 |
| Lens Surface S2 | −0.843 | 1.71510E−03 | 4.47300E−05 | 3.86236E−07 |
| Lens Surface S14 | −0.821 | −1.49667E−03 | 2.39402E−05 | −4.58026E−06 |
| Lens Surface S15 | 0.000 | −5.35677E−04 | −7.88816E−06 | 1.71520E−07 |

| | $A_{10}$ | $A_{12}$ | $A_{14}$ | $A_{16}$ |
|---|---|---|---|---|
| Lens Surface S1 | −3.50854E−09 | 1.78853E−11 | 0.00000E+00 | 0.00000E+00 |
| Lens Surface S2 | −7.34345E−09 | 5.87715E−09 | 0.00000E+00 | 0.00000E+00 |
| Lens Surface S14 | 2.19582E−07 | −2.57041E−09 | 0.00000E+00 | 0.00000E+00 |
| Lens Surface S15 | 1.98839E−08 | 8.46998E−10 | 0.00000E+00 | 0.00000E+00 |

Figure 4A:
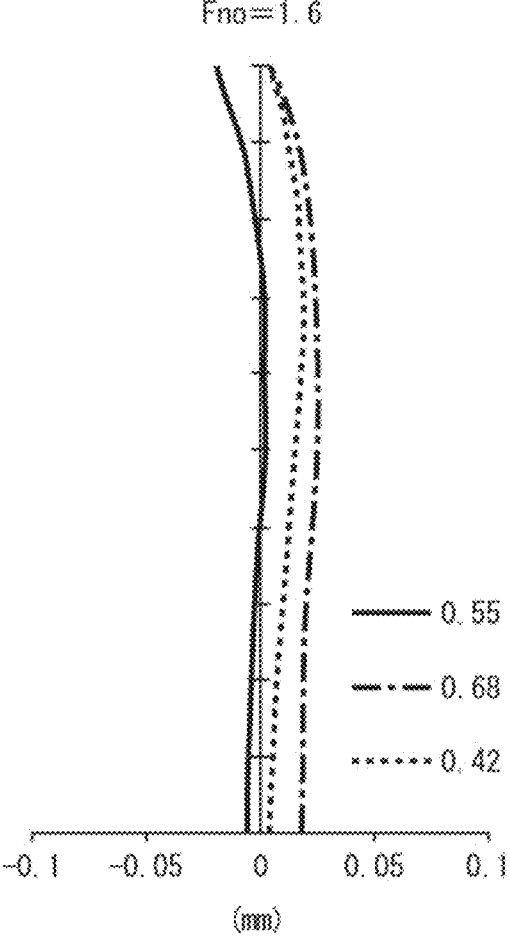
FIG. 4A is a spherical aberration diagram (longitudinal aberration diagram) of the imaging lens system according to the Example 2.
Figure 4B:
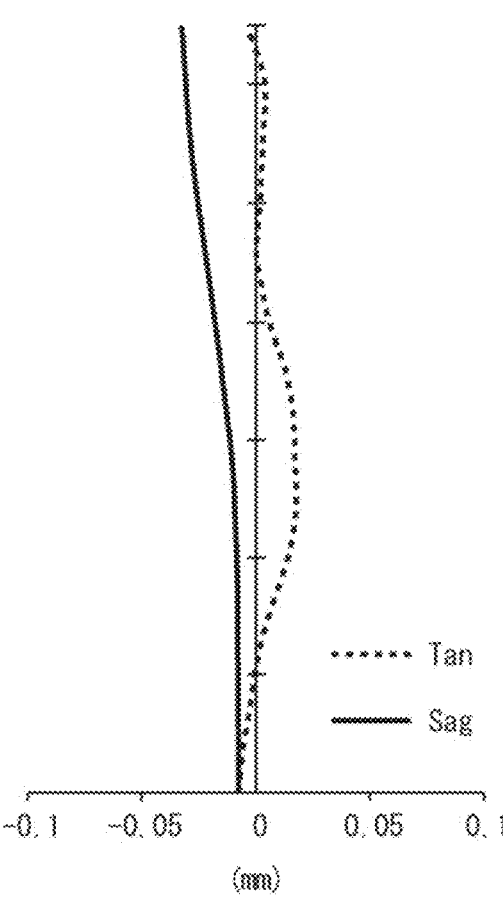
FIG. 4B is a field curvature diagram of the imaging lens system according to the Example 2.
Figure 4C:
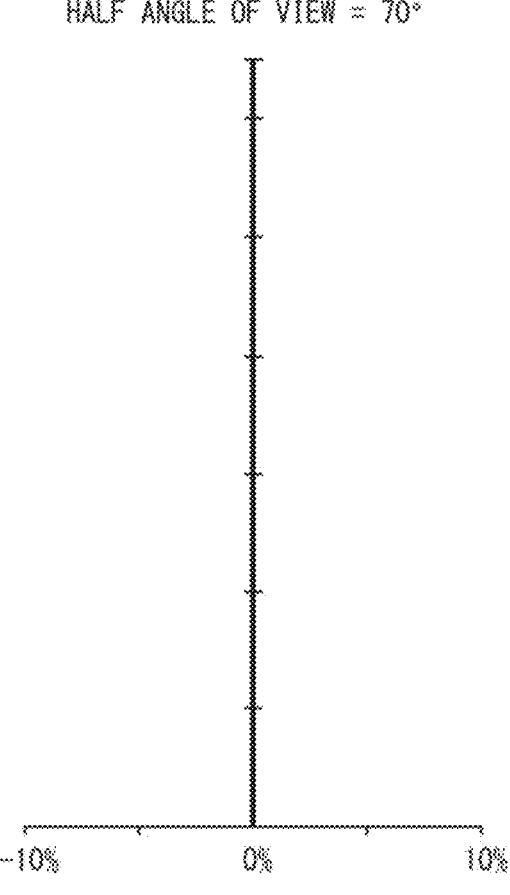
FIG. 4C is a distortion diagram of the imaging lens system according to the Example 2.

FIGS. 4A to 4C show a spherical aberration (longitudinal aberration), field curvature, and distortion in the imaging lens system 11 according to the Example 2. Since the description of the aberrations shown in FIGS. 4A to 4C is the same as that of FIGS. 2A to 2C, the descriptions thereof will be omitted.

Example 3

Figure 5:
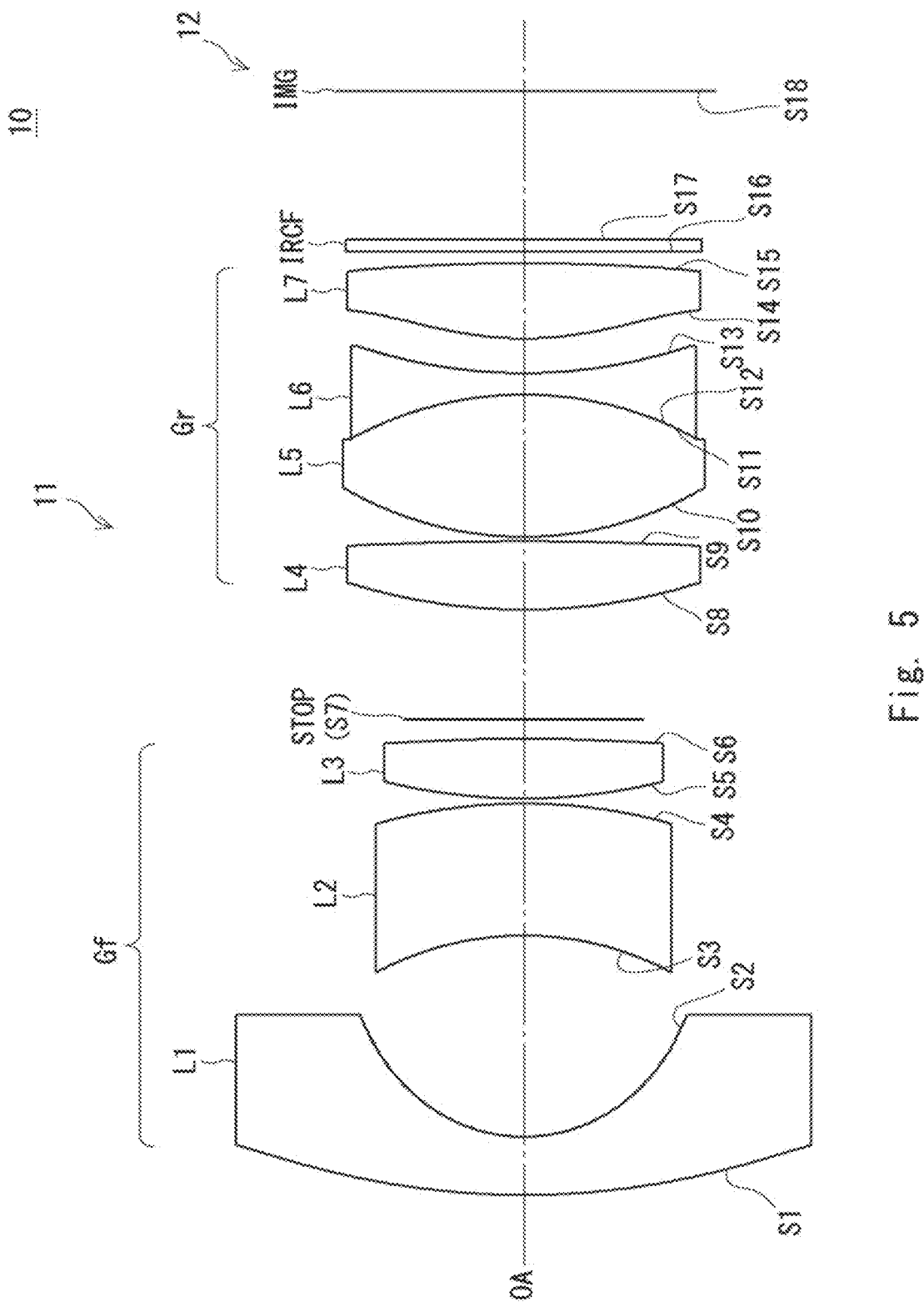
FIG. 5 is a cross-sectional view showing a configuration of a camera module and an imaging lens system according to an Example 3.

FIG. 5 is a cross-sectional view showing the camera module 10 according to an Example 3. The imaging lens system 11 according to the Example 3 differs from that according to the Example 1 in that the image-side surface S15 of the seventh lens L7 is a convex surface facing the image side. Hereinafter, property data of the imaging lens system 11 according to the Example 3 will be described.

Table 5 shows lens data of each lens surface in the imaging lens system 11 according to the Example 3. Since the items shown in Table 5 are the same as those in Table 1, descriptions thereof is omitted.

TABLE 5

| Surface Number | Curvature Radius (mm) | Thickness (mm) | Nd | vd |
|---|---|---|---|---|
| Lens Surface S1 * | 20.219 | 1.474 | 1.806 | 40.7 |
| Lens Surface S2 * | 4.083 | 5.115 | — | — |

TABLE 5-continued

| Surface Number | Curvature Radius (mm) | Thickness (mm) | Nd | vd |
|---|---|---|---|---|
| Lens Surface S3 | −7.974 | 3.347 | 1.569 | 56.0 |
| Lens Surface S4 | −13.952 | 0.120 | — | — |
| Lens Surface S5 | 14.682 | 1.519 | 1.871 | 40.7 |
| Lens Surface S6 | −52.714 | 0.488 | — | — |
| Iris Surface S7 | 0.000 | 2.791 | — | — |
| Lens Surface S8 | 14.904 | 1.728 | 1.773 | 49.6 |
| Lens Surface S9 | −84.411 | 0.120 | — | — |
| Lens Surface S10 | 9.021 | 3.601 | 1.593 | 68.6 |
| Lens Surface S11 | −9.172 | 0.005 | 1.517 | 43.0 |
| Lens Surface S12 | −9.172 | 0.550 | 1.870 | 20.0 |
| Lens Surface S13 | 13.245 | 0.873 | — | — |
| Lens Surface S14 * | 8.421 | 1.901 | 1.619 | 63.9 |
| Lens Surface S15 * | −49.122 | 0.300 | — | — |
| IRCF Surface S16 | 0.000 | 0.300 | 1.517 | 64.2 |
| IRCF Surface S17 | 0.000 | 3.778 | — | — |
| IMG Surface S18 | 0.000 | 0.000 | — | — |

Table 6 shows aspherical surface coefficients for defining aspherical surface shapes of aspherical lens surfaces in the imaging lens system 11 according to the Example 3. In Table 6, the aspherical surface shape adopted for the lens surface is expressed by an expression similar to that in the Example 1.

TABLE 6

| | k | $A_4$ | $A_6$ | $A_8$ |
|---|---|---|---|---|
| Lens Surface S1 | −15.598 | 2.15384E−04 | −1.97135E−06 | −9.09837E−09 |
| Lens Surface S2 | −0.238 | 2.46494E−04 | 1.15045E−05 | 8.69430E−07 |
| Lens Surface S13 | −1.706 | −8.92675E−04 | 7.30670E−06 | −1.24302E−06 |
| Lens Surface S14 | 0.000 | 2.31995E−04 | −2.39824E−05 | 9.65739E−07 |

| | $A_{10}$ | $A_{12}$ | $A_{14}$ | $A_{16}$ |
|---|---|---|---|---|
| Lens Surface S1 | 1.64347E−10 | 0.00000E+00 | 0.00000E+00 | 0.00000E+00 |
| Lens Surface S2 | 4.48159E−09 | 0.00000E+00 | 0.00000E+00 | 0.00000E+00 |
| Lens Surface S14 | 2.55988E−08 | 0.00000E+00 | 0.00000E+00 | 0.00000E+00 |
| Lens Surface S15 | −1.85082E−08 | 0.00000E+00 | 0.00000E+00 | 0.00000E+00 |

Figure 6A:
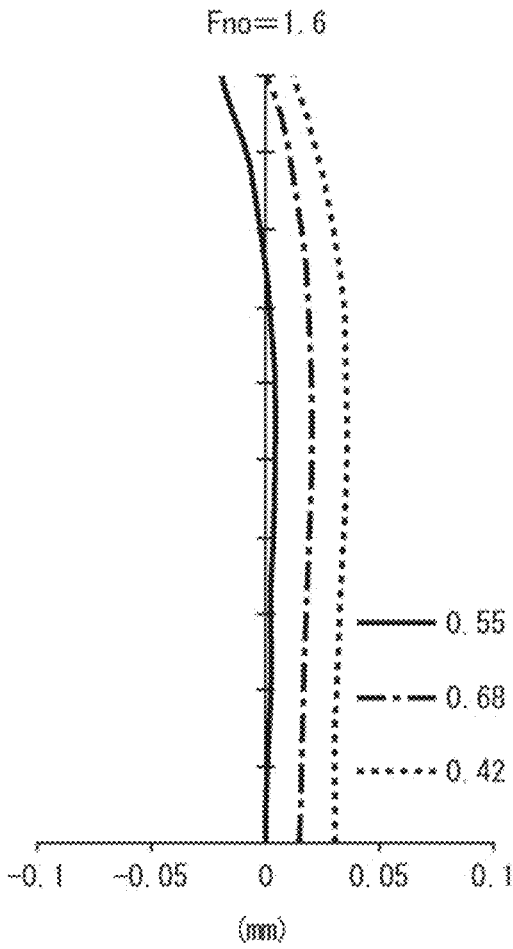
FIG. 6A is a spherical aberration diagram (longitudinal aberration diagram) of the imaging lens system according to the Example 3.
Figure 6B:
FIG. 6B is a field curvature diagram of the imaging lens system according to the Example 3.
Figure 6B:
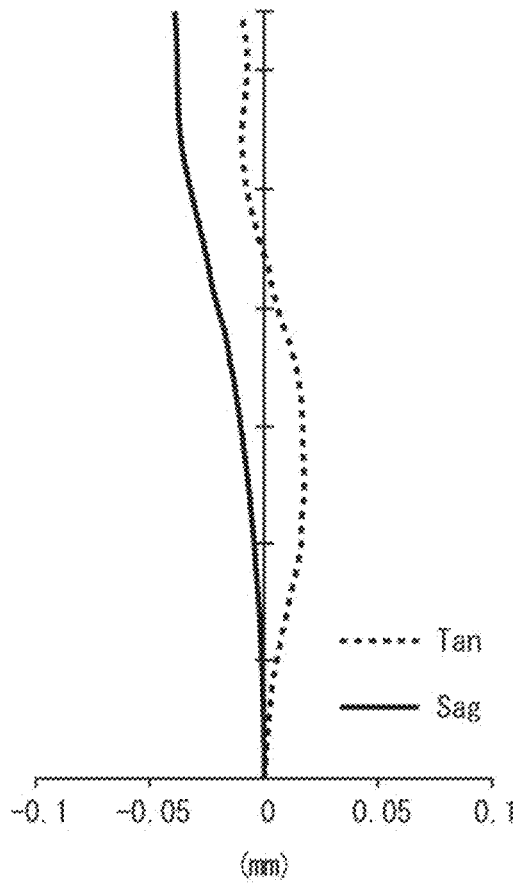
Figure 6C:
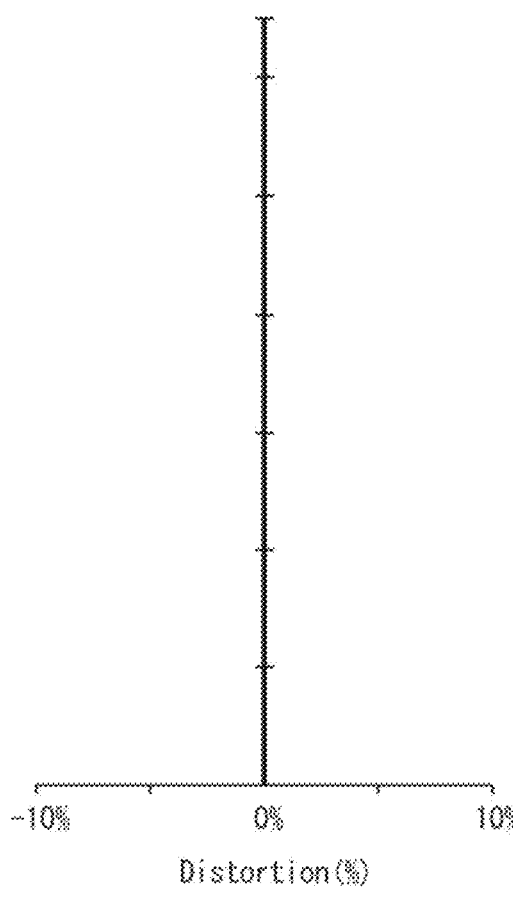
FIG. 6C is a distortion diagram of the imaging lens system according to the Example 3.

FIGS. 6A to 6C show a spherical aberration (longitudinal aberration), field curvature, and distortion in the imaging lens system 11 according to the Example 3. Since the description of the aberrations shown in FIGS. 6A to 6C is the same as that of FIGS. 2A to 2C, the descriptions thereof will be omitted.

Example 4

Figure 7:
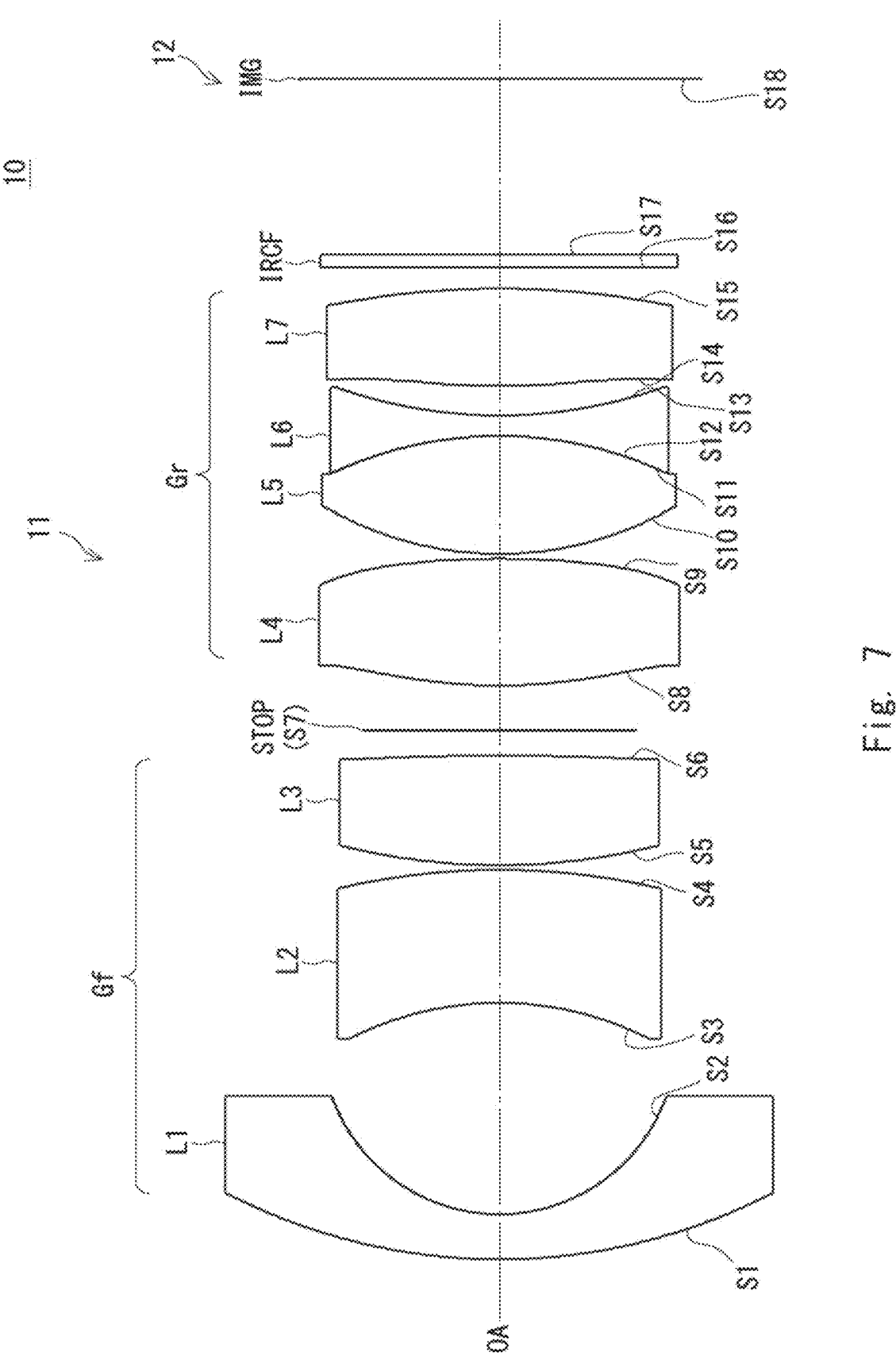
FIG. 7 is a cross-sectional view showing a configuration of a camera module and an imaging lens system according to an Example 4.

FIG. 7 is a cross-sectional view showing the camera module 10 according to an Example 4. The imaging lens system 11 according to Example 4 differs from that according to the Example 1 in that, in the imaging lens system 11 according to the Example 4, the object-side surface S1 and the image-side surface S2 of the first lens L1 have a spherical shape. Further, the imaging lens system 11 according to the Example 4 differs from that according to the Example 1 in that, in the imaging lens system 11 according to the Example 4, the object-side surface S8 and the image-side surface S9 of the fourth lens L4 have an aspheric shape. Furthermore, the imaging lens system 11 according to the Example 4 differs from that according to the Example 1 in that the image-side surface S15 of the seventh lens L7 is a convex surface facing the image side. Hereinafter, property data of the imaging lens system 11 according to the Example 4 will be described.

Table 7 shows lens data of each lens surface in the imaging lens system 11 according to the Example 4. Since the items shown in Table 7 are the same as those in Table 1, descriptions thereof is omitted.

TABLE 7

| Surface Number | Curvature Radius (mm) | Thickness (mm) | Nd | vd |
|---|---|---|---|---|
| Lens Surface S1 | 14.095 | 1.068 | 2.001 | 29.1 |
| Lens Surface S2 | 4.188 | 4.999 | — | — |
| Lens Surface S3 | −7.750 | 3.132 | 1.871 | 40.7 |
| Lens Surface S4 | −16.680 | 0.110 | — | — |
| Lens Surface S5 | 15.185 | 2.589 | 2.001 | 25.5 |
| Lens Surface S6 | −83.934 | 0.598 | — | — |
| Iris Surface S7 | 0.000 | 1.073 | — | — |
| Lens Surface S8 * | 12.797 | 2.977 | 1.768 | 49.2 |
| Lens Surface S9 * | −22.345 | 0.117 | — | — |
| Lens Surface S10 | 8.163 | 2.787 | 1.550 | 75.5 |
| Lens Surface S11 | −9.317 | 0.005 | 1.517 | 43.0 |
| Lens Surface S12 | −9.317 | 0.482 | 1.946 | 18.0 |
| Lens Surface S13 | 11.391 | 0.688 | — | — |
| Lens Surface S14 * | 15.111 | 2.303 | 1.768 | 49.2 |
| Lens Surface S15 * | −22.422 | 0.500 | — | — |
| IRCF Surface S16 | 0.000 | 0.300 | 1.517 | 64.2 |
| IRCF Surface S17 | 0.000 | 4.284 | — | — |
| IMG Surface S18 | 0.000 | 0.000 | — | — |

Table 8 shows aspherical surface coefficients for defining aspherical surface shapes of aspherical lens surfaces in the imaging lens system 11 according to the Example 4. In Table 8, the aspherical surface shape adopted for the lens surface is expressed by an expression similar to that in the Example 1.

TABLE 8

|  | k | $A_4$ | $A_6$ | $A_8$ |
|---|---|---|---|---|
| Lens Surface S8 | 0.000 | −3.25983E−04 | −8.04800E−06 | −4.00585E−07 |
| Lens Surface S9 | 0.000 | −3.10508E−04 | −1.79652E−05 | 5.25149E−07 |
| Lens Surface S14 | 0.000 | −1.46250E−03 | −5.69999E−07 | −2.81248E−06 |
| Lens Surface S15 | 0.000 | −1.54124E−04 | 2.08583E−07 | −1.79894E−06 |

|  | $A_{10}$ | $A_{12}$ | $A_{14}$ | $A_{16}$ |
|---|---|---|---|---|
| Lens Surface S8 | −1.44500E−08 | −4.40572E−10 | 0.00000E+00 | 0.00000E+00 |
| Lens Surface S9 | −5.95632E−08 | 1.14714E−09 | 0.00000E+00 | 0.00000E+00 |
| Lens Surface S14 | 1.73911E−07 | 0.00000E+00 | 0.00000E+00 | 0.00000E+00 |
| Lens Surface S15 | 1.58302E−07 | −1.89117E−09 | 0.00000E+00 | 0.00000E+00 |

Figure 8A:
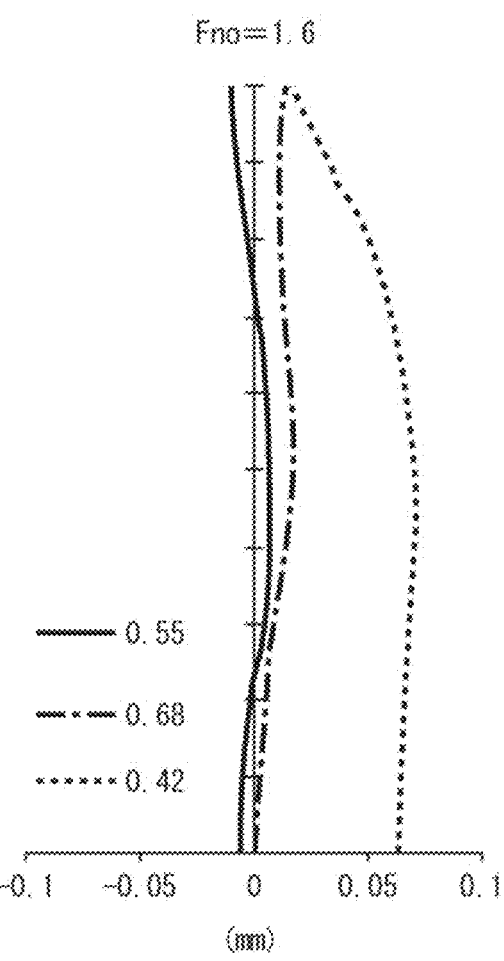
FIG. 8A is a spherical aberration diagram (longitudinal aberration diagram) of the imaging lens system according to the Example 4.
Figure 8B:
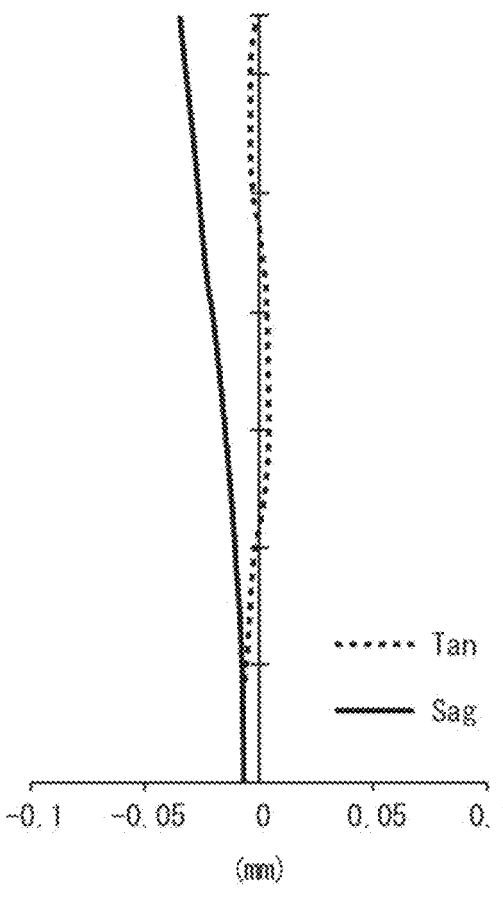
FIG. 8B is a field curvature diagram of the imaging lens system according to the Example 4.
Figure 8C:
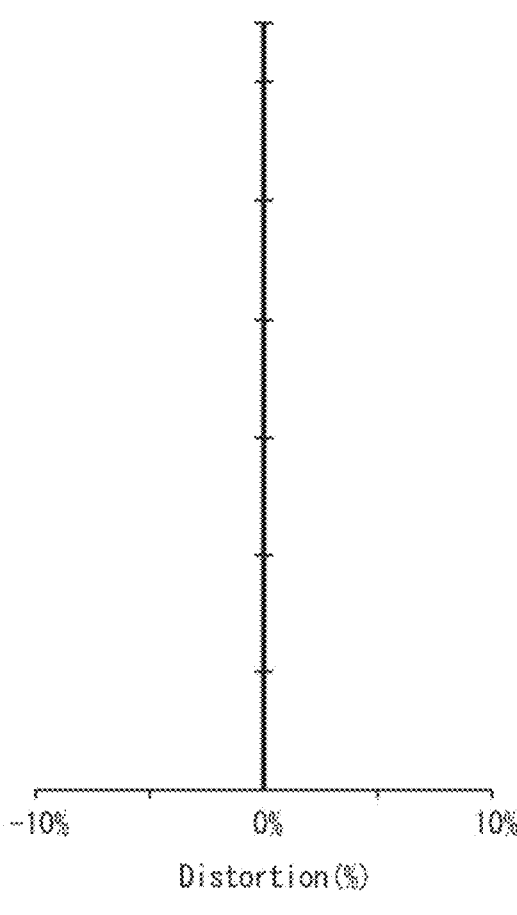
FIG. 8C is a distortion diagram of the imaging lens system according to the Example 4.

FIGS. 8A to 8C show a spherical aberration (longitudinal aberration), field curvature, and distortion in the imaging lens system 11 according to the Example 4. Since the description of the aberrations shown in FIGS. 8A to 8C is the same as that of FIGS. 2A to 2C, the descriptions thereof will be omitted.

Example 5

Figure 9:
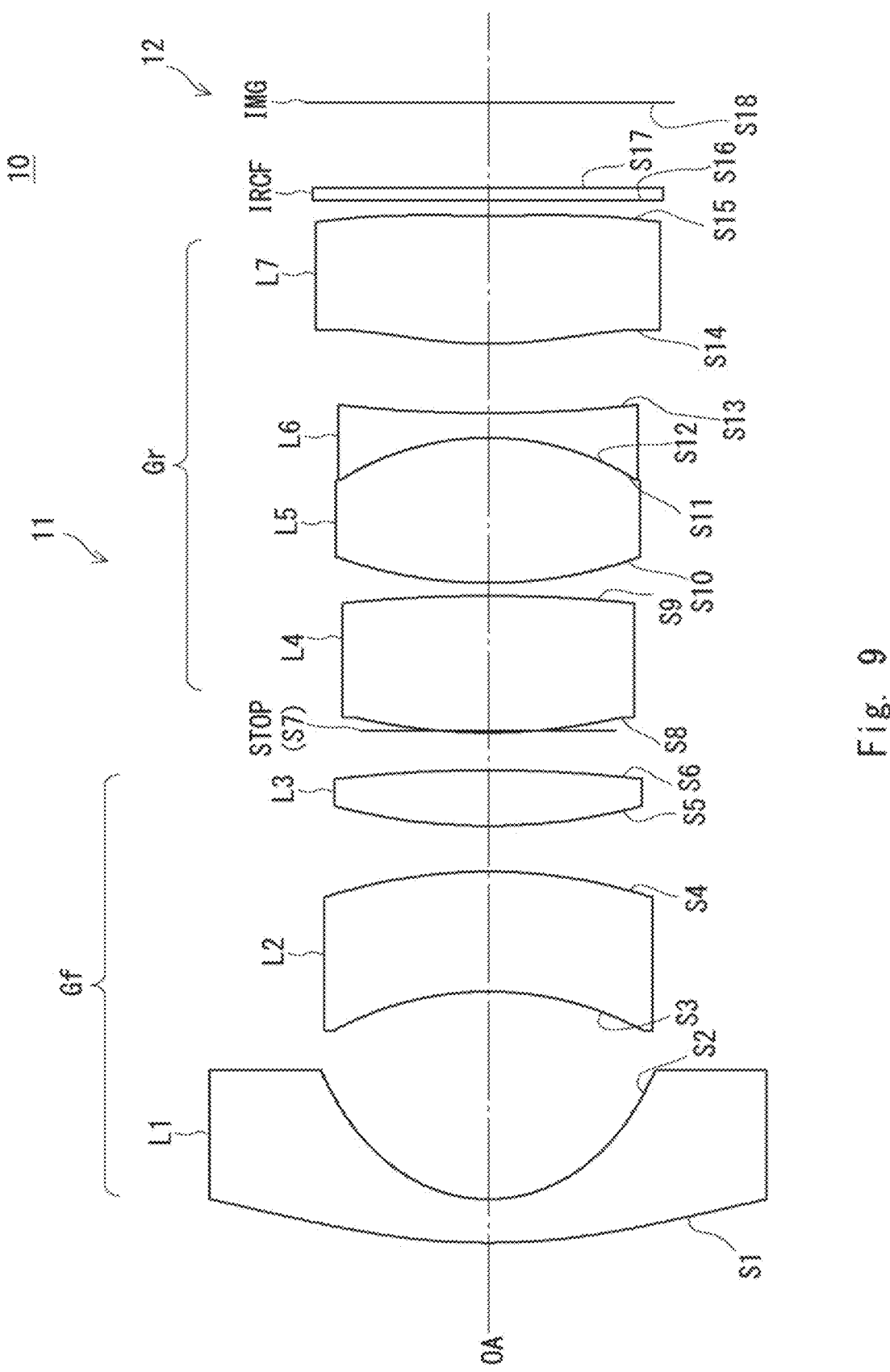
FIG. 9 is a cross-sectional view showing a configuration of a camera module and an imaging lens system according to an Example 5.

FIG. 9 is a cross-sectional view showing the camera module 10 according to an Example 5. The imaging lens system 11 according to the Example 5 differs from that according to the Example 4 in that, in the imaging lens system 11 according to the Example 5, the image-side surface S15 of the seventh lens L7 has a shape in which a convex surface faces the image side in the peripheral part and a concave surface faces the image side in the central part. Hereinafter, property data of the imaging lens system 11 according to the Example 5 will be described.

Table 9 shows lens data of each lens surface in the imaging lens system 11 according to the Example 5. Since the items shown in Table 9 are the same as those in Table 1, descriptions thereof is omitted.

TABLE 9

| Surface Number | Curvature Radius (mm) | Thickness (mm) | Nd | vd |
|---|---|---|---|---|
| Lens Surface S1 * | 16.289 | 1.106 | 1.768 | 49.2 |
| Lens Surface S2 * | 3.791 | 5.265 | — | — |

TABLE 9-continued

| Surface Number | Curvature Radius (mm) | Thickness (mm) | Nd | vd |
|---|---|---|---|---|
| Lens Surface S3 | −8.379 | 3.056 | 1.773 | 49.6 |
| Lens Surface S4 | −13.647 | 1.158 | — | — |
| Lens Surface S5 | 16.004 | 1.410 | 1.806 | 40.7 |
| Lens Surface S6 | −32.994 | 1.001 | — | — |
| Iris Surface S7 | 0.000 | −0.052 | — | — |
| Lens Surface S8 * | 14.652 | 3.461 | 1.620 | 63.9 |
| Lens Surface S9 * | −36.616 | 0.343 | — | — |
| Lens Surface S10 | 11.527 | 3.677 | 1.620 | 63.9 |
| Lens Surface S11 | −7.062 | 0.005 | 1.517 | 43.0 |
| Lens Surface S12 | −7.062 | 0.625 | 1.870 | 20.0 |
| Lens Surface S13 | 34.480 | 1.756 | — | — |
| Lens Surface S14 * | 11.002 | 3.255 | 1.768 | 49.2 |
| Lens Surface S15 * | 132.627 | 0.388 | — | — |
| IRCF Surface S16 | 0.000 | 0.300 | 1.517 | 64.2 |
| IRCF Surface S17 | 0.000 | 2.305 | — | — |
| IMG Surface S18 | 0.000 | 0.000 | — | — |

Table 10 shows aspherical surface coefficients for defining aspherical surface shapes of aspherical lens surfaces in the imaging lens system 11 according to the Example 5. In Table 10, the aspherical surface shape adopted for the lens surface is expressed by an expression similar to that in the Example 1.

TABLE 10

| | k | $A_4$ | $A_6$ | $A_8$ |
|---|---|---|---|---|
| Lens Surface S1 | 0.000 | −2.59457E−04 | 2.39677E−06 | −3.53459E−08 |
| Lens Surface S2 | −0.696 | 9.44083E−04 | 2.74789E−05 | −7.21426E−07 |
| Lens Surface S8 | 0.000 | 4.38463E−05 | 1.37905E−07 | 0.00000E+00 |
| Lens Surface S9 | 0.000 | 5.43211E−05 | 3.52287E−07 | 0.00000E+00 |
| Lens Surface S14 | 0.000 | −1.33559E−03 | −1.13648E−05 | −2.12705E−07 |
| Lens Surface S15 | 0.000 | −6.71645E−04 | −1.76606E−05 | 1.17519E−06 |

| | $A_{10}$ | $A_{12}$ | $A_{14}$ | $A_{16}$ |
|---|---|---|---|---|
| Lens Surface S1 | 2.08025E−10 | 0.00000E+00 | 0.00000E+00 | 0.00000E+00 |
| Lens Surface S2 | 2.34740E−07 | −8.05591E−09 | 8.44743E−11 | 0.00000E+00 |
| Lens Surface S8 | 0.00000E+00 | 0.00000E+00 | 0.00000E+00 | 0.00000E+00 |
| Lens Surface S9 | 0.00000E+00 | 0.00000E+00 | 0.00000E+00 | 0.00000E+00 |
| Lens Surface S14 | −4.69018E−08 | 2.89662E−09 | 0.00000E+00 | 0.00000E+00 |
| Lens Surface S15 | −3.46960E−08 | 1.38521E−09 | 0.00000E+00 | 0.00000E+00 |

Figure 10A:
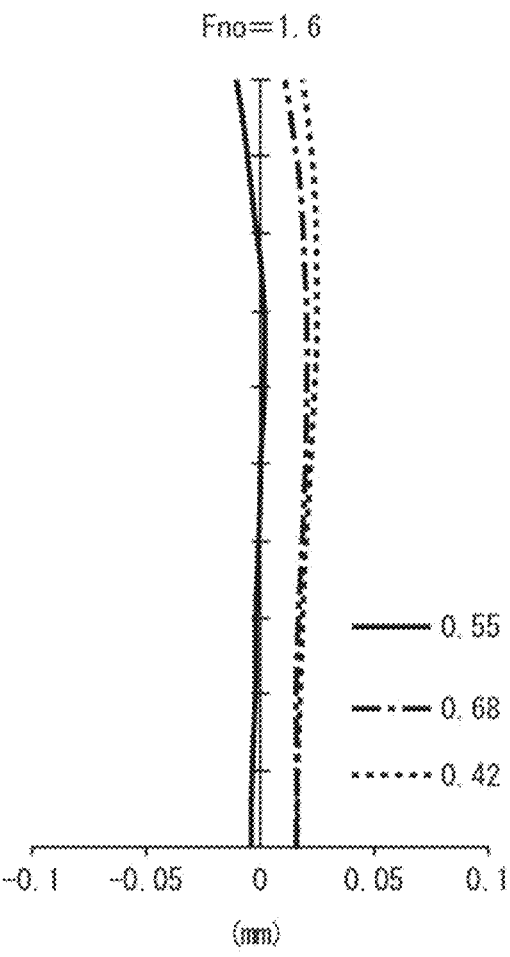
FIG. 10A is a spherical aberration diagram (longitudinal aberration diagram) of the imaging lens system according to the Example 5.
Figure 10B:
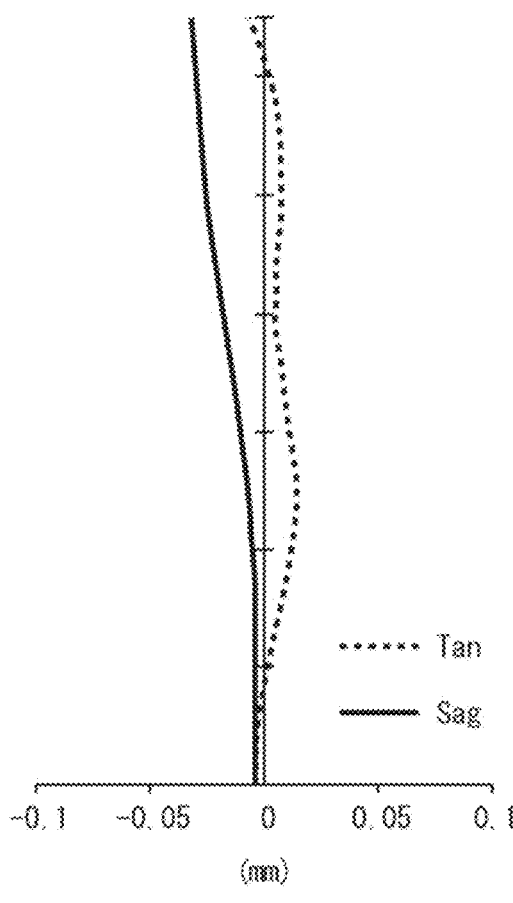
FIG. 10B is a field curvature diagram of the imaging lens system according to the Example 5.
Figure 10C:
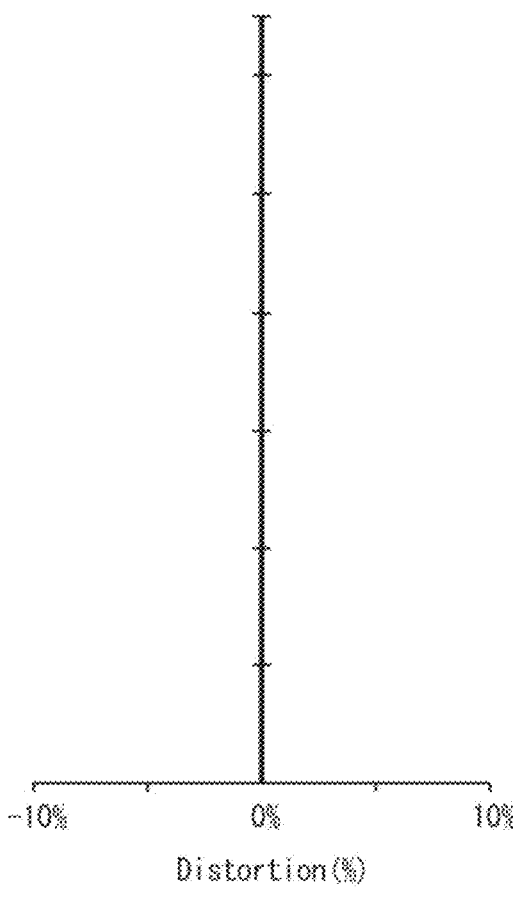
FIG. 10C is a distortion diagram of the imaging lens system according to the Example 5.

FIGS. 10A to 10C show a spherical aberration (longitudinal aberration), field curvature, and distortion in the imaging lens system 11 according to the Example 5. Since the description of the aberrations shown in FIGS. 10A to 10C is the same as that of FIGS. 2A to 2C, the descriptions thereof will be omitted.

Example 6

Figure 11:
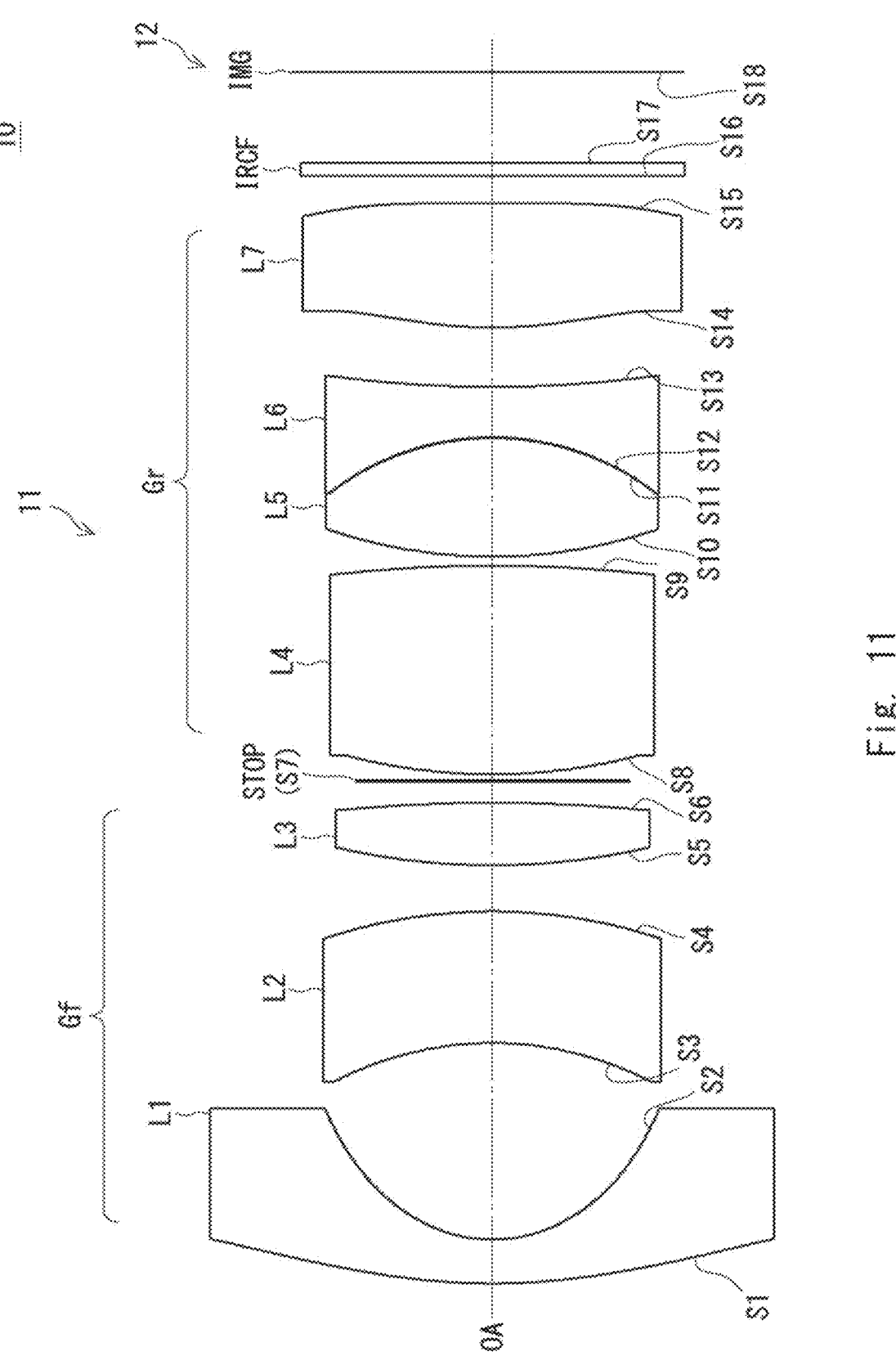
FIG. 11 is a cross-sectional view showing a configuration of a camera module and an imaging lens system according to an Example 6.

FIG. 11 is a cross-sectional view showing the camera module 10 according to the Example 6. Since the imaging lens system 11 according to the Example 6 has the same lens configuration as that of the Example 4, the descriptions thereof will be omitted. Hereinafter, property data of the imaging lens system 11 according to an Example 6 will be described.

Table 11 shows lens data of each lens surface in the imaging lens system 11 according to the Example 6. Since the items shown in Table 11 are the same as those in Table 1, descriptions thereof is omitted.

TABLE 11

| Surface Number | Curvature Radius (mm) | Thickness (mm) | Nd | vd |
|---|---|---|---|---|
| Lens Surface S1 * | 15.588 | 1.056 | 1.768 | 49.2 |
| Lens Surface S2 * | 3.505 | 4.690 | — | — |

TABLE 11-continued

| Surface Number | Curvature Radius (mm) | Thickness (mm) | Nd | vd |
|---|---|---|---|---|
| Lens Surface S3 | −8.331 | 3.144 | 1.773 | 49.6 |
| Lens Surface S4 | −12.881 | 1.114 | — | — |
| Lens Surface S5 | 16.890 | 1.501 | 1.900 | 37.4 |
| Lens Surface S6 | −35.522 | 0.501 | — | — |
| Iris Surface S7 | 0.000 | 0.166 | — | — |
| Lens Surface S8 * | 14.198 | 4.990 | 1.619 | 63.9 |
| Lens Surface S9 * | −31.883 | 0.215 | — | — |
| Lens Surface S10 | 12.162 | 2.842 | 1.620 | 63.9 |
| Lens Surface S11 | −6.401 | 0.005 | 1.517 | 43.0 |
| Lens Surface S12 | −6.401 | 1.221 | 1.870 | 20.0 |
| Lens Surface S13 | 29.394 | 1.415 | — | — |
| Lens Surface S14 * | 10.474 | 2.961 | 1.768 | 49.2 |
| Lens Surface S15 * | −1.5.E+07 | 0.665 | — | — |
| IRCF Surface S16 | 0.000 | 0.300 | 1.517 | 64.2 |
| IRCF Surface S17 | 0.000 | 2.360 | — | — |
| IMG Surface S18 | 0.000 | 0.000 | — | — |

Table 12 shows aspherical surface coefficients for defining aspherical surface shapes of aspherical lens surfaces in the imaging lens system 11 according to the Example 6. In Table 12, the aspherical surface shape adopted for the lens surface is expressed by an expression similar to that in the Example 1.

TABLE 12

| | k | $A_4$ | $A_6$ | $A_8$ |
|---|---|---|---|---|
| Lens Surface S1 | −8.451 | −2.11536E−05 | −2.86625E−07 | −1.09917E−09 |
| Lens Surface S2 | −0.637 | 8.53217E−04 | 4.35239E−05 | −7.27122E−07 |
| Lens Surface S8 | 0.000 | 4.86610E−05 | 2.54395E−06 | −1.72289E−07 |
| Lens Surface S9 | 0.000 | −5.49420E−05 | 2.12666E−05 | −1.38291E−06 |
| Lens Surface S14 | −1.829 | −1.07016E−03 | −1.36112E−05 | −1.42037E−07 |
| Lens Surface S15 | 0.000 | −7.09030E−04 | −2.00649E−05 | 1.13074E−06 |

| | $A_{10}$ | $A_{12}$ | $A_{14}$ | $A_{16}$ |
|---|---|---|---|---|
| Lens Surface S1 | 0.00000E+00 | 0.00000E+00 | 0.00000E+00 | 0.00000E+00 |
| Lens Surface S2 | 2.25402E−07 | −7.35591E−09 | 2.07822E−10 | 0.00000E+00 |
| Lens Surface S8 | 7.43058E−09 | 0.00000E+00 | 0.00000E+00 | 0.00000E+00 |
| Lens Surface S9 | 3.47785E−08 | 0.00000E+00 | 0.00000E+00 | 0.00000E+00 |
| Lens Surface S14 | −2.60169E−08 | 1.85587E−09 | 0.00000E+00 | 0.00000E+00 |
| Lens Surface S15 | −3.90870E−08 | 1.34511E−09 | 0.00000E+00 | 0.00000E+00 |

Figure 12A:
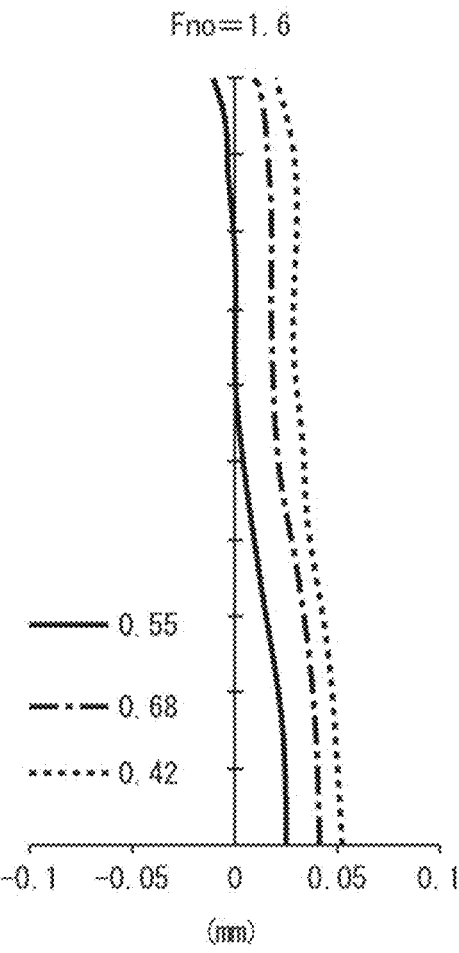
FIG. 12A is a spherical aberration diagram (longitudinal aberration diagram) of the imaging lens system according to the Example 6.
Figure 12B:
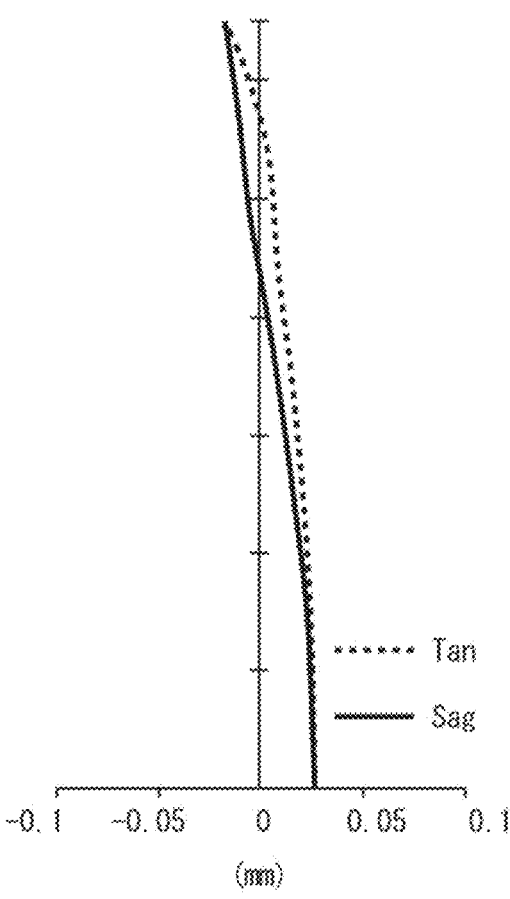
FIG. 12B is a field curvature diagram of the imaging lens system according to the Example 6.
Figure 12C:
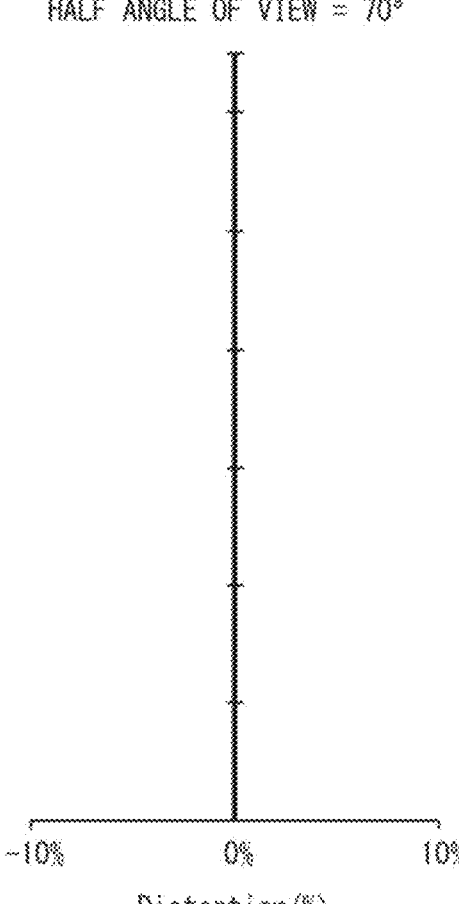
FIG. 12C is a distortion diagram of the imaging lens system according to the Example 6.

FIGS. 12A to 12C show a spherical aberration (longitudinal aberration), field curvature, and distortion in the imaging lens system 11 according to the Example 6. Since the description of the aberrations shown in FIGS. 12A to 12C is the same as that of FIGS. 2A to 2C, the descriptions thereof will be omitted.

Table 13 shows a focal length F1 of the first lens L1, a focal length F2 of the second lens L2, a focal length F3 of the third lens L3, a focal length F4 of the fourth lens L4, a focal length F5 of the fifth lens L5, a focal length F6 of the sixth lens L6, a focal length F7 of the seventh lens L7, a focal length F of the entire optical system of the imaging lens system 11, an F1/F-F7/F value, a composite focal length Frg of the fourth lens L4 to the seventh lens L7 of the rear lens group, (L1–STOP)/F value, an F1/F3 value, a total track length TTL of the optical system of the imaging lens system 11, and a TTL/F value. In Table 13, the units of the focal length and the total track length are both mm. The focal length and the total track length shown in Table 13 are calculated using a wavelength ray of 550 nm.

imaging lens system 11 can be made compact. In addition, the generation of the aberration in the first lens L1 can be suppressed.

In Examples 1 to 6, the imaging lens system 11 satisfies the numerical range of Expression (4). Thus, the imaging lens system 11 can be made compact. Furthermore, a favorable angle of view property can be obtained, an angle of view can be made wider, and generation of an aberration in the first lens L1 can be suppressed.

In Examples 1 to 6, the second lens L2 to the sixth lens L6 are arranged in a so-called tandem arrangement. This enables correction of a coma aberration, a lateral color aberration, and a distortion to be favorably performed.

Further, since the camera module 10 includes the imaging lens system 11, the camera module 10 can be made compact. Additionally, the imaging lens system 11 provides sufficient brightness required for image recognition in autonomous driving, thereby improving the sensing accuracy of the camera module 10.

TABLE 13

|  | Example 1 | Example 2 | Example 3 | Example 4 | Example 5 | Example 6 |
|---|---|---|---|---|---|---|
| F1 | −6.501 | −6.548 | −6.583 | −6.248 | −6.663 | −6.095 |
| F2 | −37.944 | −37.258 | −40.928 | −19.778 | −37.472 | −43.544 |
| F3 | 14.054 | 13.805 | 13.260 | 12.914 | 13.473 | 12.816 |
| F4 | 17.042 | 13.903 | 16.453 | 10.953 | 17.270 | 16.506 |
| F5 | 8.061 | 8.800 | 8.257 | 8.358 | 7.617 | 7.162 |
| F6 | −8.916 | −7.891 | −6.097 | −5.296 | −6.623 | −5.887 |
| F7 | 20.706 | 19.475 | 11.726 | 12.024 | 15.374 | 13.579 |
| F | 3.851 | 3.847 | 3.851 | 3.855 | 3.848 | 3.847 |
| F1/F | −1.69 | −1.70 | −1.71 | −1.62 | −1.73 | −1.58 |
| F2/F | −9.85 | −9.69 | −10.63 | −5.13 | −9.74 | −11.32 |
| F3/F | 3.65 | 3.59 | 3.44 | 3.35 | 3.50 | 3.33 |
| F4/F | 4.43 | 3.61 | 4.27 | 2.84 | 4.49 | 4.29 |
| F5/F | 2.09 | 2.29 | 2.14 | 2.17 | 1.98 | 1.86 |
| F6/F | −2.32 | −2.05 | −1.58 | −1.37 | −1.72 | −1.53 |
| F7/F | 5.38 | 5.06 | 3.05 | 3.12 | 4.00 | 3.53 |
| Frg | 8.738 | 9.193 | 9.179 | 8.592 | 9.997 | 10.174 |
| Frg/F | 2.27 | 2.39 | 2.38 | 2.23 | 2.60 | 2.64 |
| (L1-STOP)/F | 3.28 | 3.30 | 3.07 | 3.14 | 3.30 | 3.04 |
| F1/F3 | −0.46 | −0.47 | −0.50 | −0.48 | −0.49 | −0.48 |
| TTL | 28.050 | 28.030 | 28.000 | 28.010 | 29.060 | 29.120 |
| TTL/F | 7.28 | 7.29 | 7.27 | 7.27 | 7.55 | 7.57 |

In Examples 1 to 6, the imaging lens system 11 satisfies the numerical range of the above Expression (1). Thus, the imaging lens system 11 can be made compact and the aberration can be sufficiently reduced. Further, since the aberration can be sufficiently reduced, the imaging lens system 11 can be made sufficiently bright. In fact, as shown in FIGS. 2A to 2C, 4A to 4C, 6A to 6C, 8A to 8C, 10A to 10C, and 12A to 12C, the imaging lens system 11 according to the Examples 1 to 6 favorably reduces various aberrations, has excellent imaging performance, and achieves high resolution.

Further, in the Examples 1 to 6, the imaging lens system 11 satisfies the numerical range of Expression (2). As a result, the diameter of the first lens L1 arranged closest to the object side among the lenses included in the front lens group Gf can be reduced, and the chance of collision of a stepping stone with the first lens L1 can be reduced, and also the imaging lens system 11 can be made compact.

Figure 13:
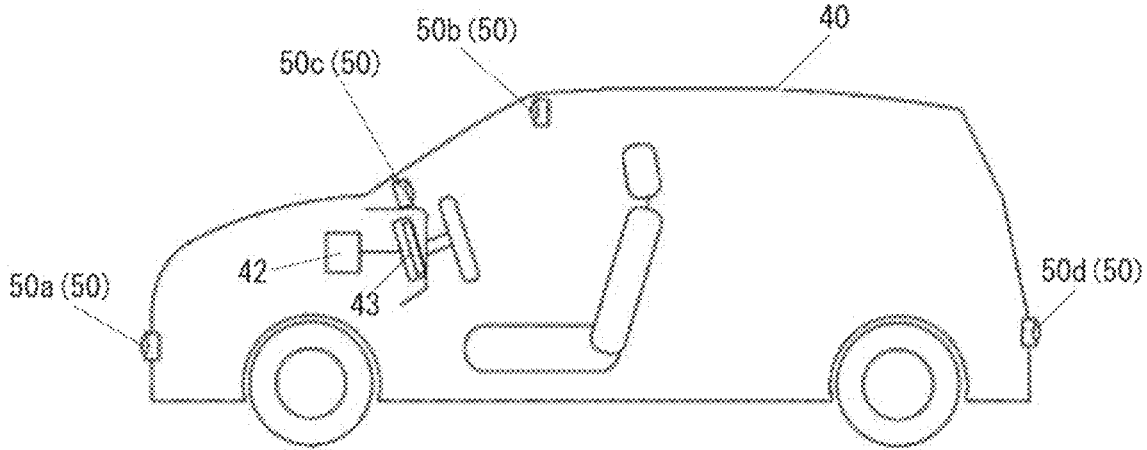
FIG. 13 is an overview diagram of a car including an in-vehicle system with a camera module according to an embodiment of the present disclosure.

Further, in the Examples 1 the 6, the imaging lens system 11 satisfies the numerical range of Expression (3). As a result, it is possible to shorten the length of the optical system of the front lens group Gf while facilitating correction of the aberration in the rear lens group Gr, and the Third Embodiment FIG. 13 is overview diagram of a car 40 on which an in-vehicle system is mounted. The in-vehicle system includes capturing apparatuses 50 each including the imaging lens system 11 according to the first embodiment or second embodiment and a capturing element for converting light converged therethrough into electrical signals. As shown in the drawing, the capturing apparatus 50 can be mounted on the car 40. FIG. 13 is an example arrangement showing positions on the car 40 where the capturing apparatuses 50 are mounted. The capturing apparatuses 50 mounted on the car 40 may also be referred to as on-board cameras and may be installed at various positions on the car 40. For example, a first capturing apparatus 50*a* may be arranged on or near the front bumper as a camera to monitor the front area of the car 40 as it travels. A second capturing apparatus 50*b* for monitoring the front area may be arranged near the inner rearview mirror inside the vehicle compartment of the car 40. A third capturing apparatus 50*c* may be arranged on the dashboard, inside the instrument panel or the like as a camera for monitoring the driver's driving condition. A fourth capturing apparatus 50*d* may be installed at the rear of the car 40 for monitoring the rear area of the car 40. The capturing apparatuses 50*a* and 50*b* may be referred to as front cameras. The third capturing apparatus 50*c* may be referred to as an in-camera. The fourth capturing apparatus 50*d* may be referred to as a rear camera. The capturing apparatuses 50 are not limited to these, but also includes capturing apparatuses installed at various positions, such as a left side camera capturing images on the left rear side and a right side camera capturing images on the right rear side.

Image signals of the images captured by the capturing apparatuses 50 may be output to an information processing apparatus 42 and/or a display apparatus 43 or the like inside the car 40. The information processing apparatus 42 and display apparatus 43 constitute the in-vehicle system together with the capturing apparatuses 50. The information processing apparatus 42 inside the car 40 includes an apparatus that processes the image signals acquired by the capturing apparatuses 50, recognizes the recognition of various objects in the captured images, and assists the driver in driving. The information processing apparatus 42 also includes, but is not limited to, for example, a navigation apparatus, a collision damage reduction brake apparatus, a distance control apparatus, and a lane departure warning apparatus. The display apparatus 43 displays the images processed and output by the information processing apparatus 42, and may also receive the image signals directly from the capturing apparatuses 50. The display apparatus 43 may also employ, but is not limited to, a Liquid Crystal Display (LCD), an organic EL (Electro-Luminescence) display, and an inorganic EL display. The display apparatus 43 may display to the driver the image signals output from the capturing apparatuses 50 that capture images at positions difficult to be seen by the driver, such as a rear camera.

Figure 14:
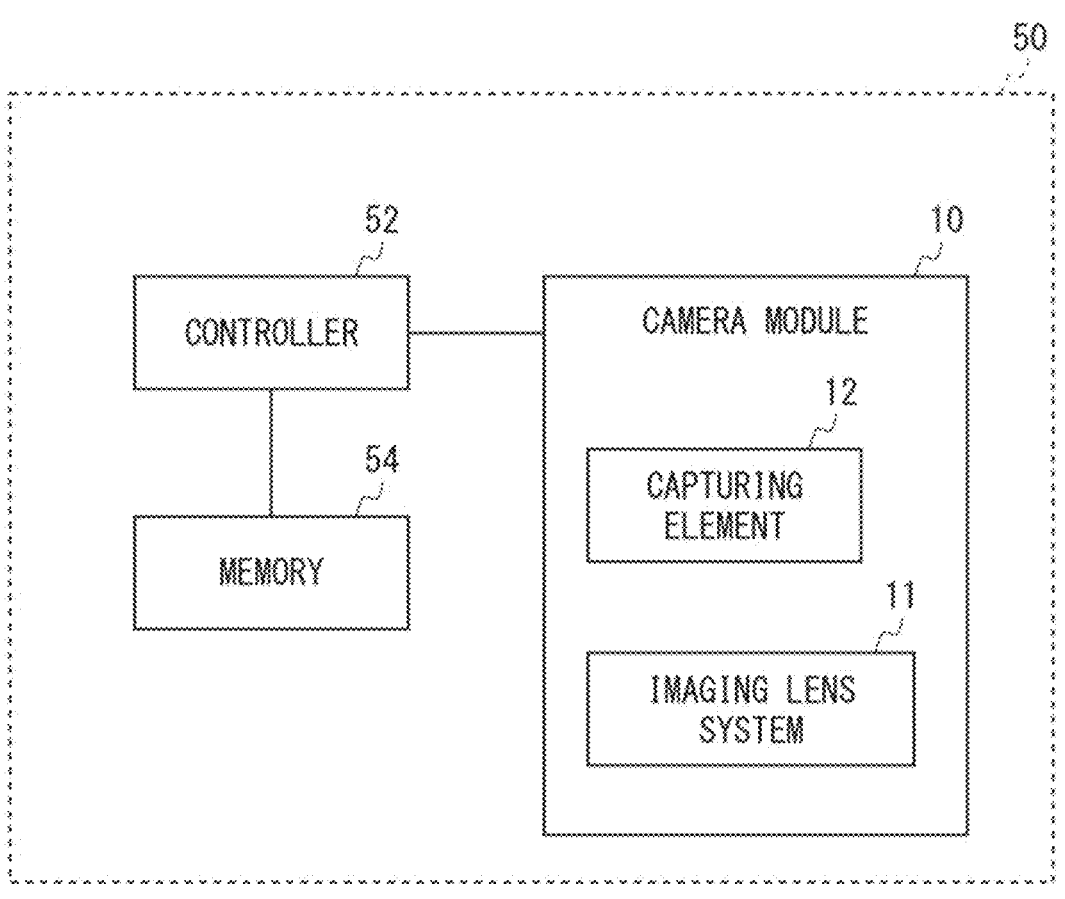
FIG. 14 is a block diagram showing a configuration of a capturing apparatus constituting the in-vehicle system of FIG. 13.

FIG. 14 shows the configuration of the capturing apparatus 50 constituting the in-vehicle system of FIG. 13. As shown in the drawing, the capturing apparatus 50 according to one embodiment includes a controller 52, a memory 54, and a camera module 10.

The controller 52 controls the camera module 10 and processes electrical signals output from the capturing element 12 of the camera module 10. The controller 52 may be configured as, for example, a processor. The controller 52 may also include one or more processors. The processor may include a general purpose processor that loads a specific program to perform a specific function, and a dedicated processor specialized in a specific process. The dedicated processor may include an ASIC (Application Specific Integrated Circuit). The processor may include a programmable logic device. A programmable logic device is also referred to as a PLD (Programmable Logic Device). A PLD may include a FPGA (Field-Programmable Gate Array). The controller 52 may be either a SoC (System-on-a-Chip) with one or more processors working together, or a SiP (System In a Package).

The memory 54 stores various information or parameters related to the operation of the capturing apparatuses 50. The memory 54 may be composed of, for example, a semiconductor memory. The memory 54 may function as a work memory for the controller 52. The memory 54 may store the captured images. The memory 54 may store various parameters for the controller 52 to perform detection processing based on the captured images. The memory 54 may be included in the controller 52.

As described above, the camera module 10 uses the capturing element 12 to capture a subject image formed through the imaging lens system 11, and outputs the imaged image. The image captured by the camera module 10 is also referred to as the captured image.

The capturing element 12 may be composed of, for example, a CMOS (Complementary Metal Oxide Semiconductor) image sensor or a CCD (Charge Coupled Device). The capturing element 12 has an imaging surface on which a plurality of pixels are arranged. Each pixel outputs a signal specified by current or voltage according to an incident light quantity. The signal output by each pixel is also referred to as imaging data.

The imaging data of all pixels may be read out by the camera module 10 and captured by the controller 52 as a captured image. The captured image read out for all pixels is also referred to as a maximum captured image. The imaging data of some pixels may be read out by the camera module 10 and captured as a captured image. In other words, the imaging data may be read out from pixels in a predetermined capture range. The imaging data read out from pixels in the predetermined capture range may be captured as a captured image. The predetermined capture range may be set by the controller 52. The camera module 10 may acquire the predetermined capture range from the controller 52. The capturing element 12 may acquire an image of a predetermined capture range of the subject image formed through the imaging lens system 11.

Note that the present disclosure is not limited to the above-described examples, and they can be modified as appropriate without departing from the scope and spirit of the disclosure. For example, the use of the imaging lens system according to the present disclosure is not limited to vehicle-mounted cameras and surveillance cameras, and instead can also be used for other uses such as cameras or the like used in small electronic apparatuses such as mobile phones.

INDUSTRIAL APPLICABILITY

It is possible to provide an imaging lens system, a camera module, an in-vehicle system, and a vehicle which can be made compact and have sufficient brightness.

REFERENCE SIGNS LIST

10 CAMERA MODULE
11 IMAGING LENS SYSTEM
12 CAPTURING ELEMENT
40 CAR (VEHICLE)
42 INFORMATION PROCESSING APPARATUS (PROCESSING APPARATUS)
43 DISPLAY APPARATUS (OUTPUT APPARATUS)
50 CAPTURING APPARATUS
52 CONTROLLER
L1 FIRST LENS
L2 SECOND LENS
L3 THIRD LENS
L4 FOURTH LENS
L5 FIFTH LENS
L6 SIXTH LENS
L7 SEVENTH LENS
STOP IRIS
GF FRONT LENS GROUP
GR REAR LENS GROUP
IRCF INFRARED CUT FILTER
IMG FOCAL PLANE
OA OPTICAL AXIS

The invention claimed is:

1. An imaging lens system comprising, sequentially from an object side toward an image side:

a front lens group comprising:

a first lens, the first lens being a meniscus lens having negative power with an object-side surface whose convex surface faces the object side;

a second lens, the second lens being a meniscus lens with the object-side surface whose concave surface faces the object side; and a third lens having positive power:

an iris; and a rear lens group comprising:

a fourth lens having positive power;

a fifth lens and a sixth lens constituting a cemented lens; and a seventh lens, wherein the imaging lens system satisfies a following Expression (1):

$$2.0 < Frg/F < 3.0 \tag{1}$$

where Frg is a composite focal length of the rear lens group and F is a focal length of an entire optical system, wherein the third lens is a biconvex lens, the fourth lens is a biconvex lens, a convex surface of an object-side surface of the fifth lens faces the object side, and a concave surface of an image-side surface of the sixth lens faces the image side.

2. The imaging lens system according to claim 1, wherein the imaging lens system a following Expression (2):

$$(L1{-}STOP)/F < 3.5 \tag{2}$$

where L1–STOP is a distance on a center optical axis between the object-side surface of the first lens and the iris.

3. The imaging lens system according to claim 1, wherein the imaging lens system a following Expression (3):

$$-0.7 < F1/F3 < -0.4 \tag{3}$$

where F1 is a focal length of the first lens and F3 is a focal length of the third lens.

4. The imaging lens system according to claim 1, wherein the imaging lens system satisfies a following Expression (4):

$$-1.8 < F1/F < -1.5 \tag{4}$$

where F1 is the focal length of the first lens.

5. A camera module comprising:

the imaging lens system according to claim 1; and a capturing element configured to convert light condensed through the imaging lens system into an electrical signal.

6. An in-vehicle system mounted on a car comprising:

the camera module according to claim 5; and an information processing apparatus configured to process a captured image output from the capturing element of the camera module and recognize an object in the captured image.

7. A vehicle on which the in-vehicle system according to claim 6 is mounted, further comprising an output apparatus configured to output information to a crew, wherein the information processing apparatus is configured to output recognition information about the object to the output apparatus.

\* \* \* \* \*